(12) United States Patent
Sudo et al.

(10) Patent No.: US 11,557,312 B2
(45) Date of Patent: Jan. 17, 2023

(54) MAGNETIC DISK DEVICE AND HEAD CHANGE PROCESSING METHOD

(71) Applicants: KABUSHIKI KAISHA TOSHIBA, Tokyo (JP); TOSHIBA ELECTRONIC DEVICES & STORAGE CORPORATION, Tokyo (JP)

(72) Inventors: Daisuke Sudo, Kawasaki Kanagawa (JP); Takeyori Hara, Kawasaki Kanagawa (JP)

(73) Assignees: KABUSHIKI KAISHA TOSHIBA, Tokyo (JP); TOSHIBA ELECTRONIC DEVICES & STORAGE CORPORATION, Tokyo (JP)

( * ) Notice: Subject to any disclaimer, the term of this patent is extended or adjusted under 35 U.S.C. 154(b) by 0 days.

(21) Appl. No.: 17/465,794

(22) Filed: Sep. 2, 2021

(65) Prior Publication Data

US 2022/0215858 A1  Jul. 7, 2022

(30) Foreign Application Priority Data

Jan. 5, 2021  (JP) ............................... JP2021-000450

(51) Int. Cl.
*G11B 5/56* (2006.01)
*G11B 5/58* (2006.01)
*G11B 5/012* (2006.01)
*G11B 21/10* (2006.01)

(52) U.S. Cl.
CPC ............ *G11B 5/012* (2013.01); *G11B 21/106* (2013.01)

(58) Field of Classification Search
CPC .. G11B 27/36; G11B 5/54; G11B 5/09; G11B 5/00; G11B 5/5539; G11B 20/20; G11B 5/56; G11B 5/58
USPC .................... 360/75, 77.08, 77.05, 78.04, 48
See application file for complete search history.

(56) References Cited

U.S. PATENT DOCUMENTS

| 5,444,371 | A | 8/1995 | Tomisaki et al. |
| 5,615,191 | A | 3/1997 | Takeda et al. |
| 6,786,978 | B2 | 9/2004 | Tsung |
| 6,865,051 | B2 | 3/2005 | Takaishi |
| 7,489,468 | B2 | 2/2009 | Ohinata et al. |
| 9,070,411 | B1 | 6/2015 | Ellis et al. |
| 2004/0001273 | A1* | 1/2004 | Takaishi ............... G11B 21/083 |
| 2009/0161248 | A1 | 6/2009 | Sudo |

(Continued)

FOREIGN PATENT DOCUMENTS

| JP | 3198490 B2 | 8/2001 |
| JP | 2008-217979 A | 9/2008 |
| JP | 4279336 B1 | 6/2009 |

(Continued)

*Primary Examiner* — Nabil Z Hindi
(74) *Attorney, Agent, or Firm* — Allen & Overy LLP

(57) ABSTRACT

According to one embodiment, a magnetic disk device includes a first disk, the second disk, and a first head which writes and reads to the first disk, a second head which writes and reads to the second disk, and a controller which calculates an estimated position at which the second head is estimated to be disposed on the second disk based on first relative position information related to a relative position in a radial direction between the first head and the second head when the first head is switched to the second head.

18 Claims, 22 Drawing Sheets

(56) References Cited

U.S. PATENT DOCUMENTS

2011/0141611 A1    6/2011   Sudo

FOREIGN PATENT DOCUMENTS

| JP | 4322901 | B2 | 9/2009 |
| JP | 4764506 | B2 | 9/2011 |

\* cited by examiner

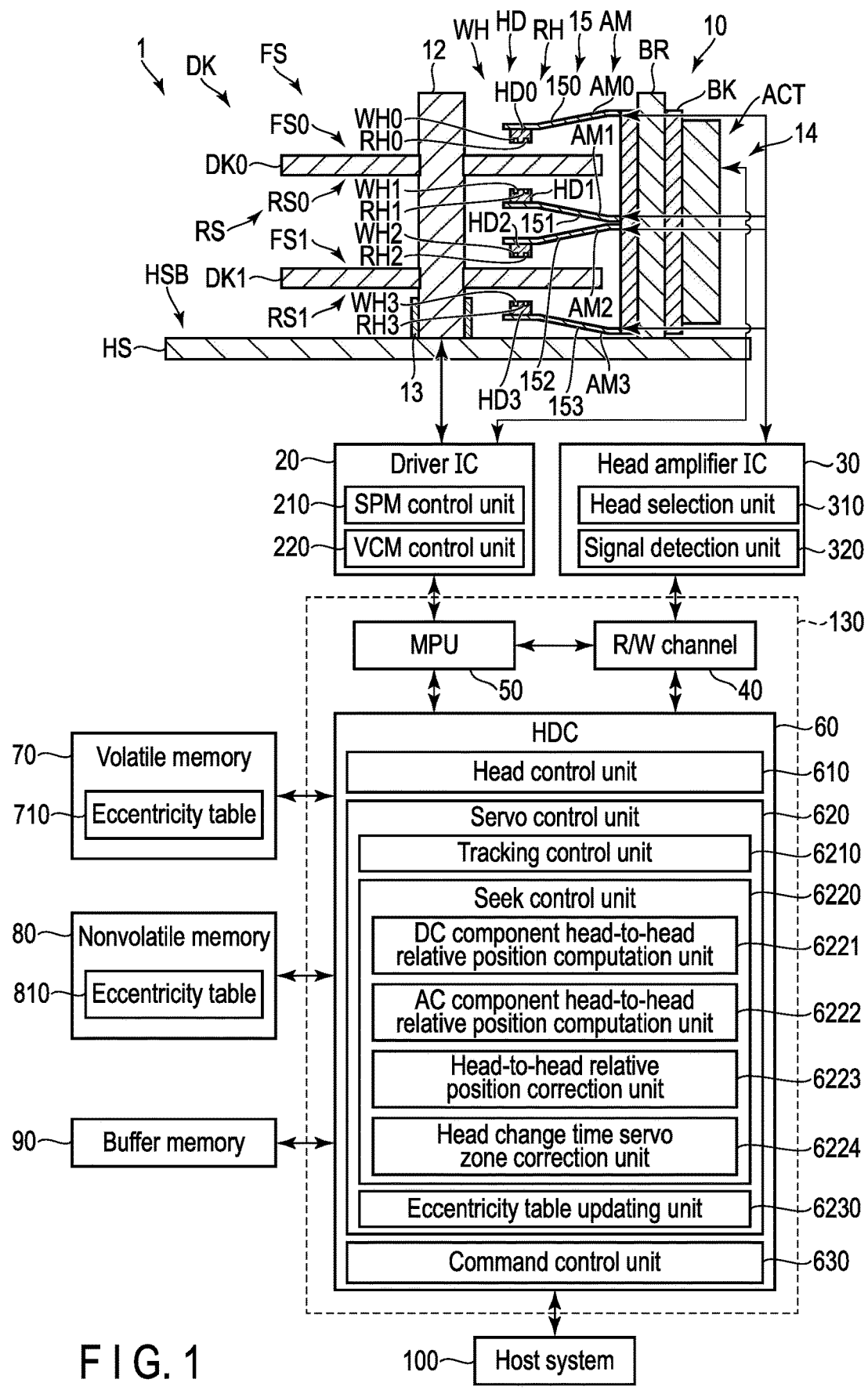
F I G. 1

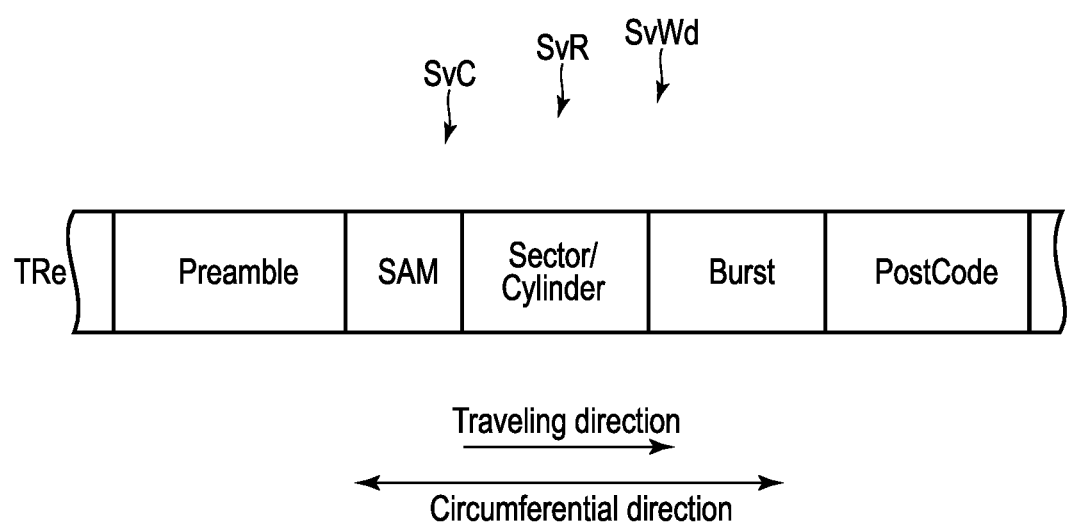
F I G. 5

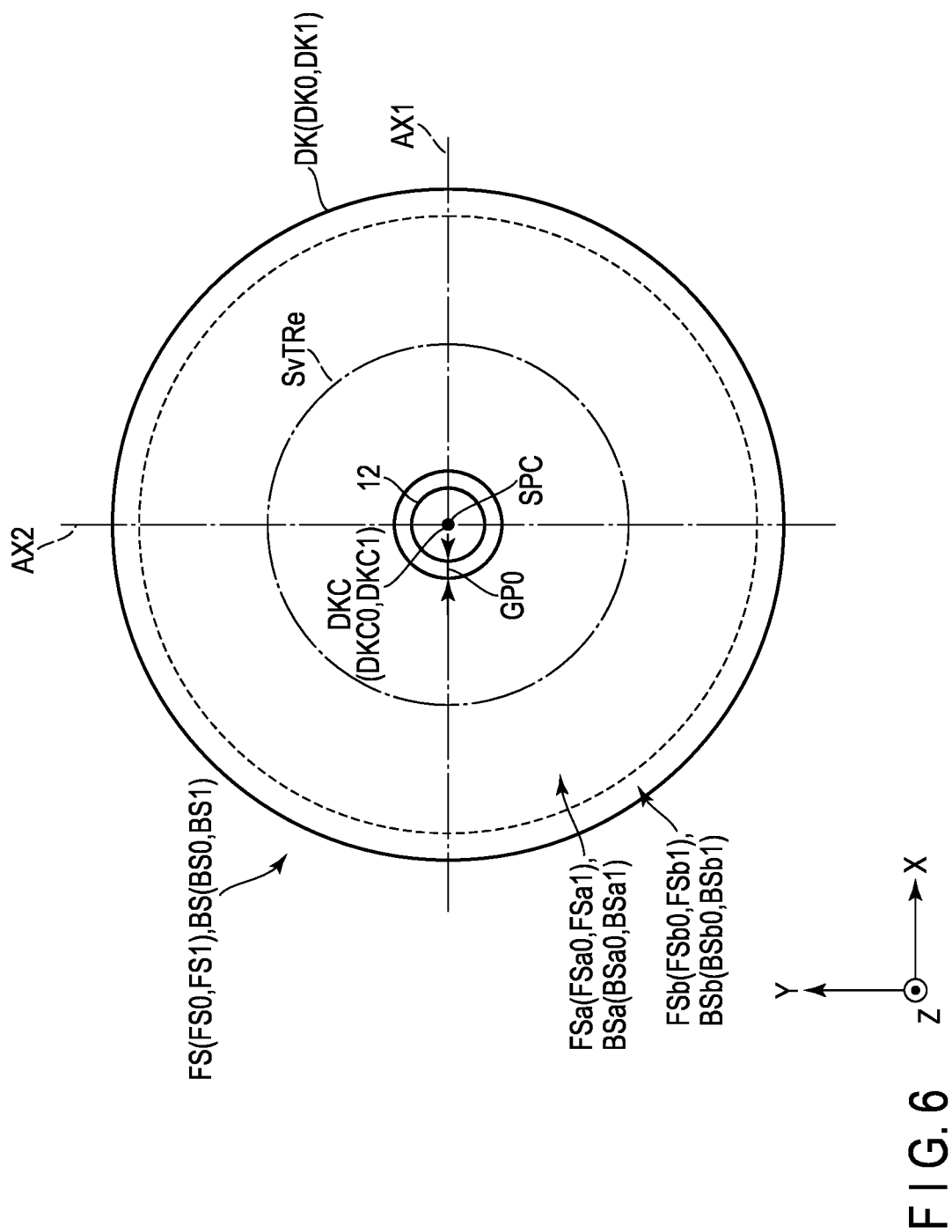
F I G. 6

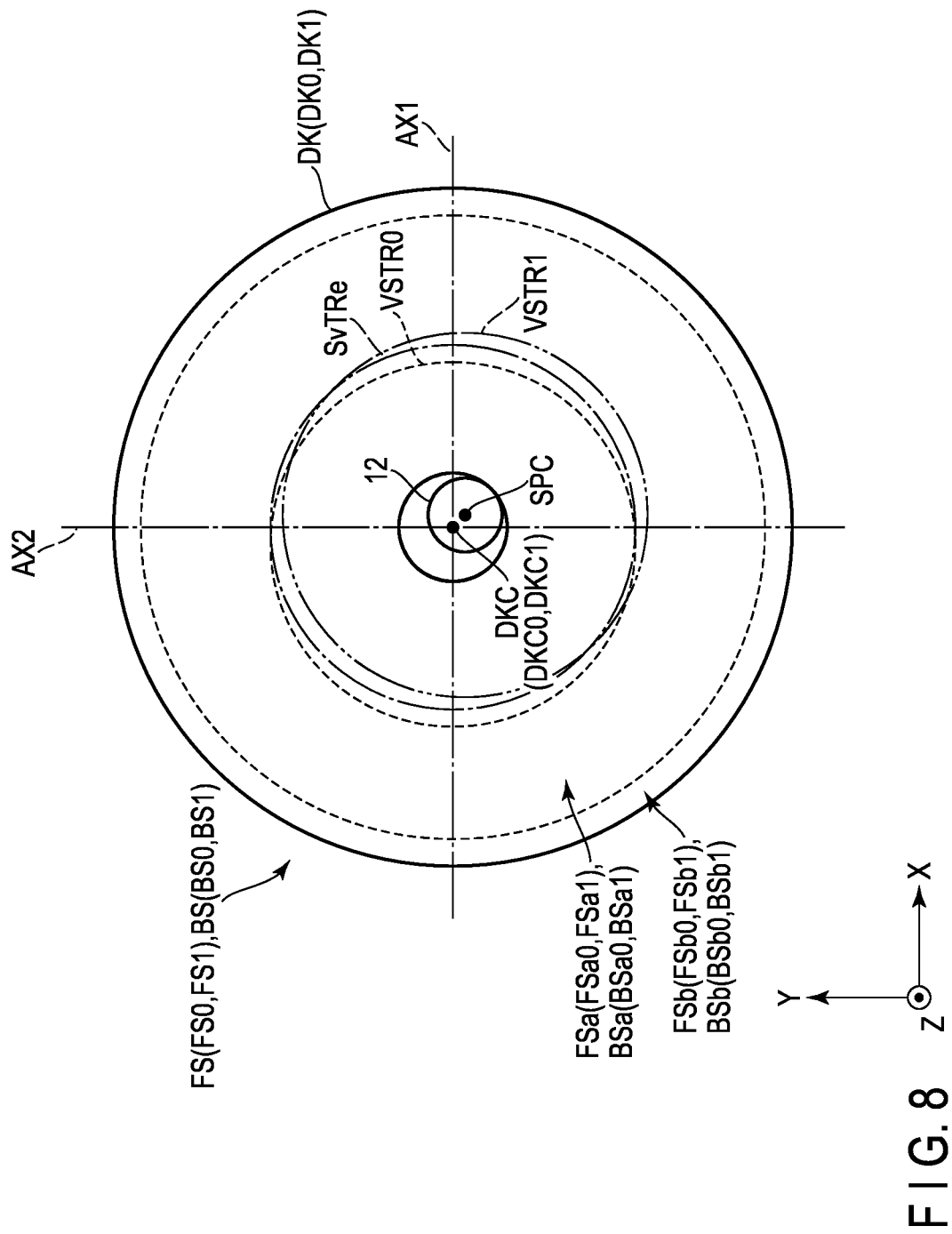
F I G. 8

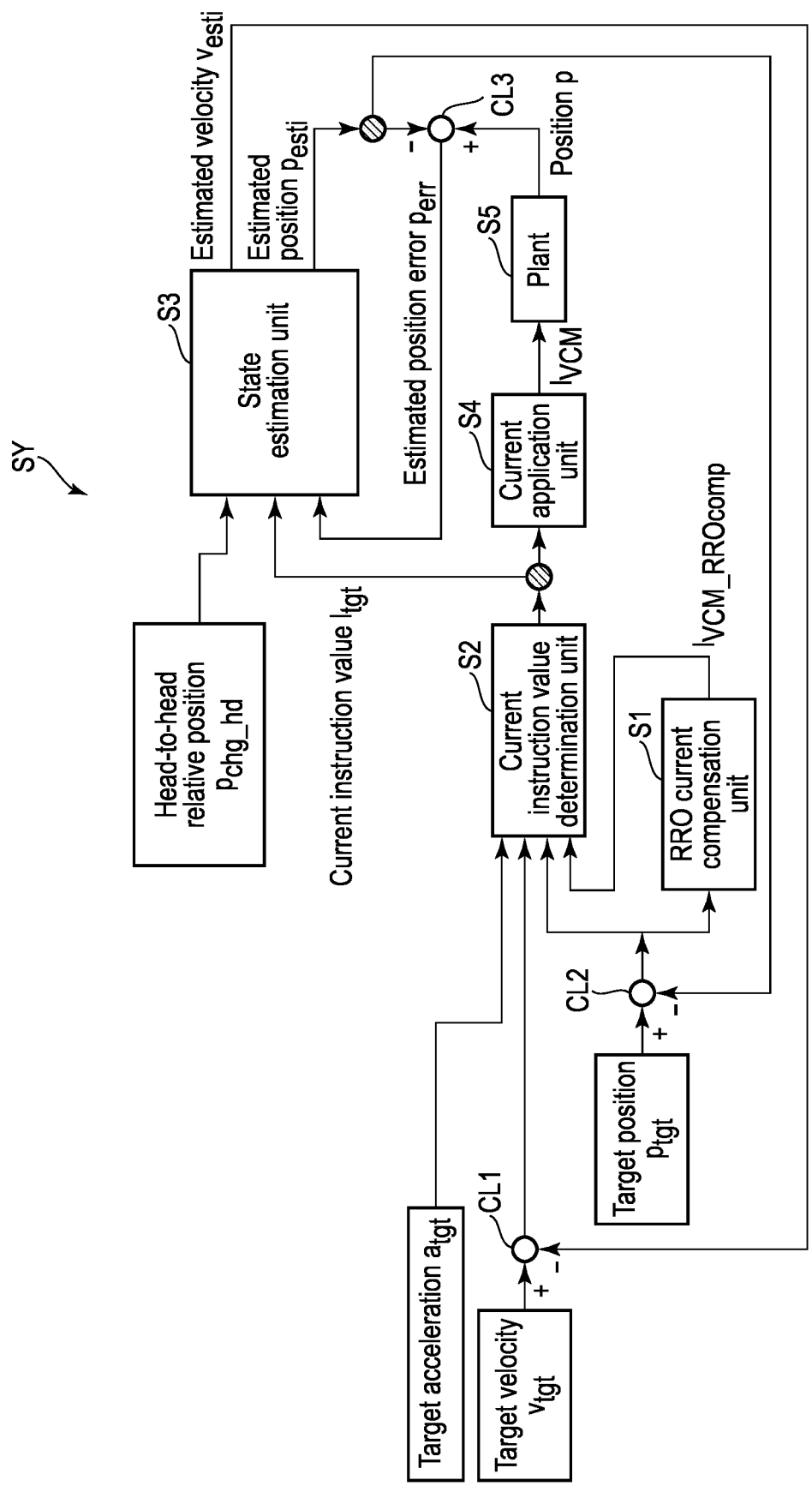
F I G. 9

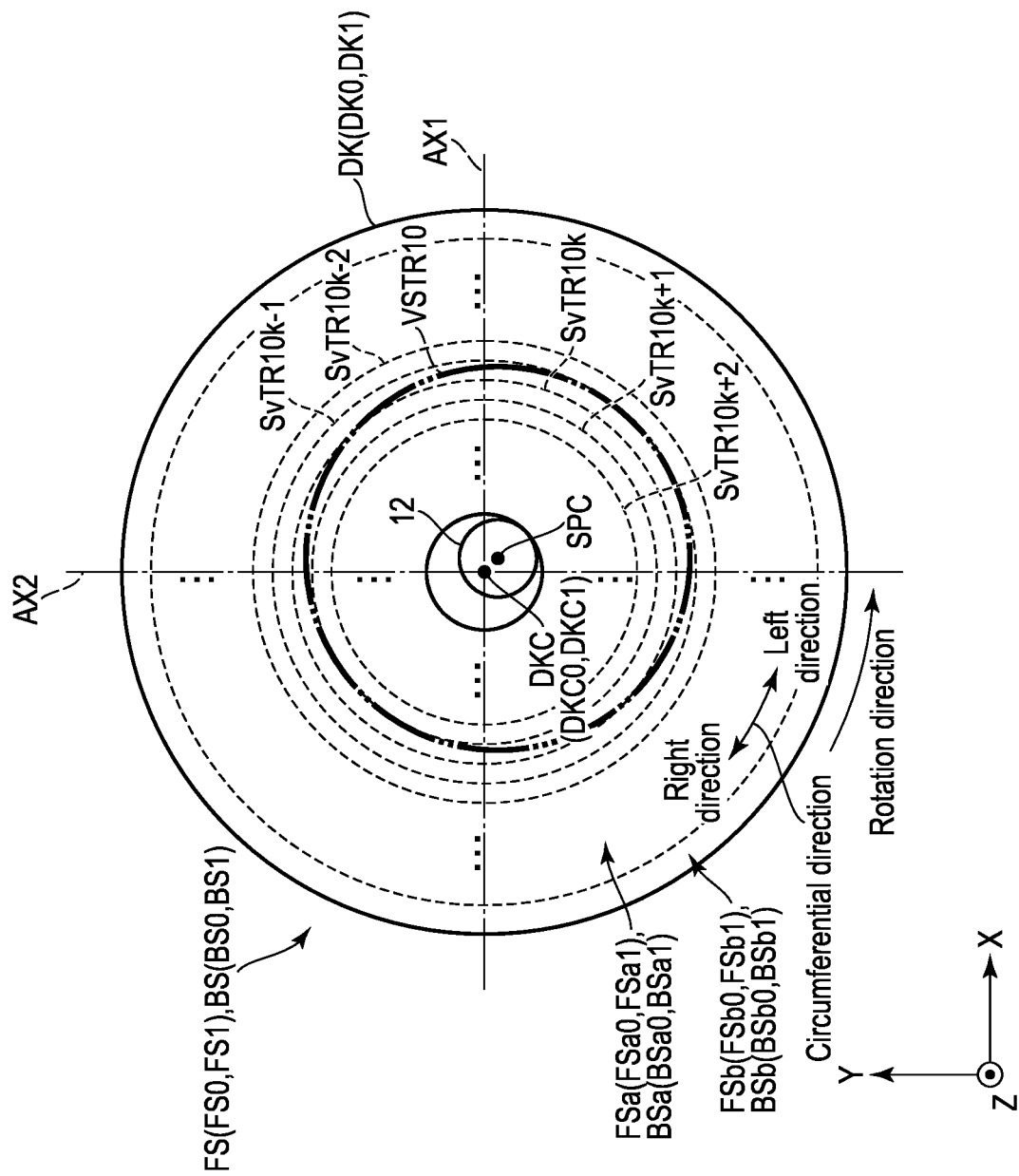
F I G. 10

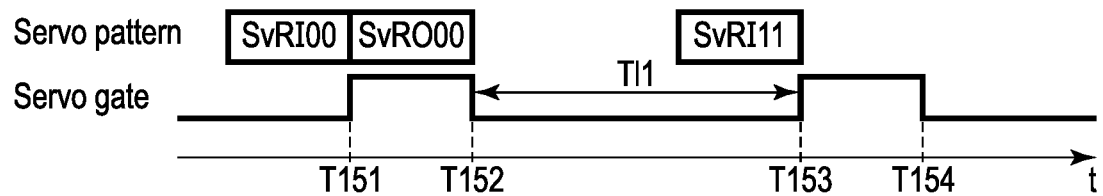
F I G. 15
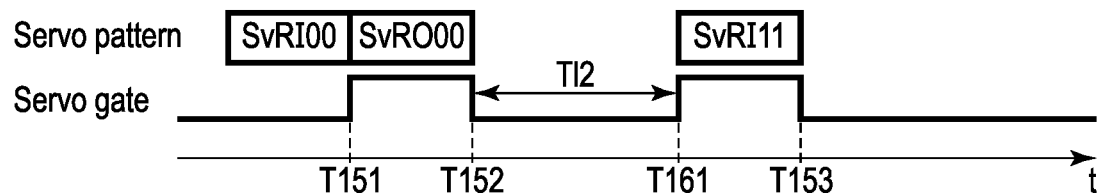
F I G. 16

| | Index | | | | |
|---|---|---|---|---|---|
| | 0 | 1 | ... | ... | Nsv_sct-1 |
| COSTABLE | [] | [] | ... | ... | [**] |
| SINTABLE | [] | [] | ... | ... | [**] |

TB181

| Head | [R1c,R1s] |
|---|---|
| HD0 | [,] |
| HD1 | [,] |
| ⋮ | ⋮ |
| HDn | [,] |

TB191

F I G. 19

| [dR1c,dR1s] | | To | | | | |
|---|---|---|---|---|---|---|
| | | HD0 | HD1 | ... | ... | HDn |
| From | HD0 | [,] | [,] | ... | ... | [,] |
| | HD1 | [,] | [,] | ... | ... | [,] |
| | ⋮ | ⋮ | ⋮ | ⋮ | ... | ⋮ |
| | HDn | [,] | [,] | ... | ... | [,] |

TB201

F I G. 20

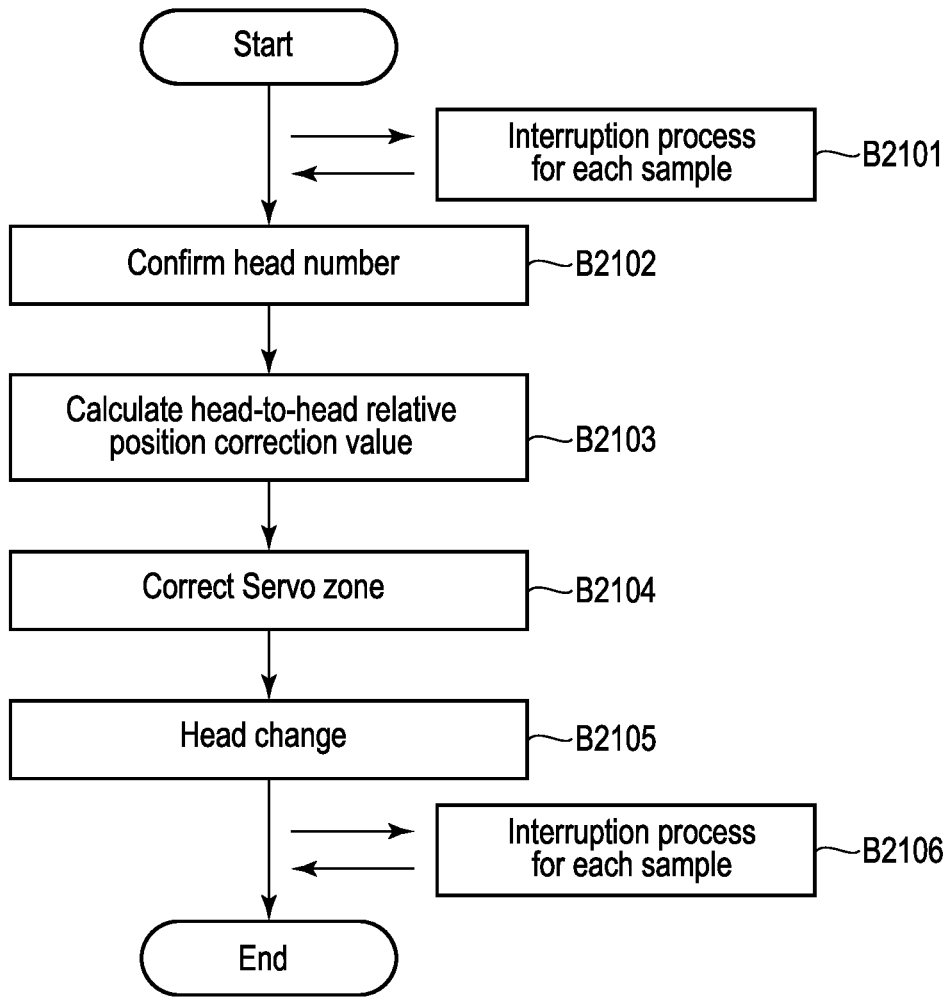
F I G. 21

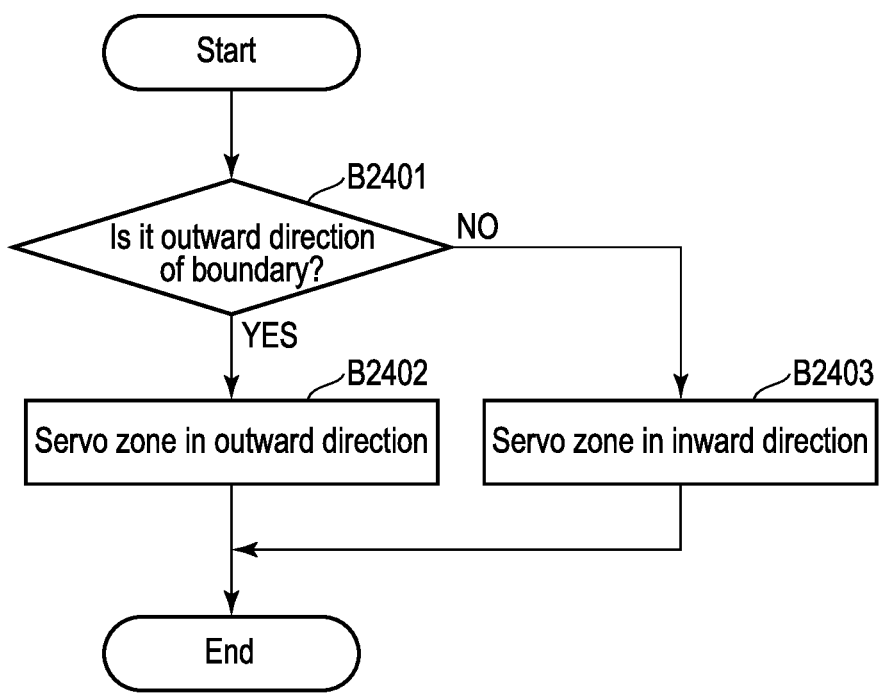
F I G. 24

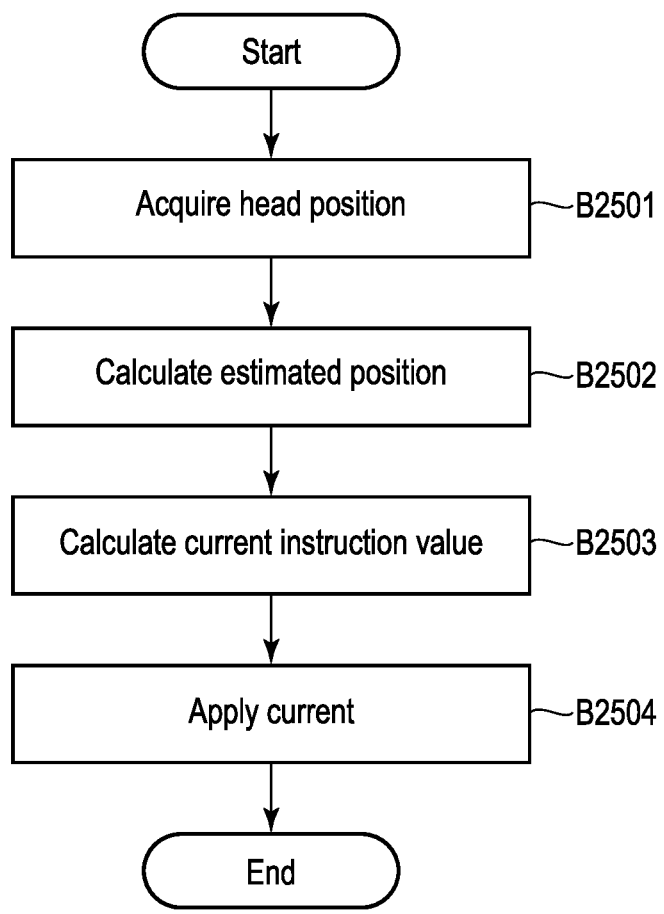
F I G. 25

MAGNETIC DISK DEVICE AND HEAD CHANGE PROCESSING METHOD

CROSS-REFERENCE TO RELATED APPLICATIONS

This application is based upon and claims the benefit of priority from Japanese Patent Application No. 2021-000450, filed Jan. 5, 2021, the entire contents of which are incorporated herein by reference.

FIELD

Embodiments described herein relate generally to a magnetic disk device and a head change processing method.

BACKGROUND

The magnetic disk device can have a plurality of disks that is relatively eccentric (in the following, sometimes referred to as relative eccentricity) due to the occurrence of subsequent disk displacement (in the following, sometimes referred to as a subsequent disk shift) and a plurality of heads individually corresponding to the plurality of disks. In the case in which during a particular head of a plurality of heads reading a particular cylinder (a particular track), another head that is different from the particular head is switched (head-changed) to read this cylinder (track), the magnetic disk device possibly reads a cylinder (track) different from this cylinder (track).

A magnetic disk device (in the following, sometimes referred to as a zone servo type magnetic disk device) having servo data divided in the radial direction is being developed. In the case in which during a particular head of a plurality of heads reading a particular cylinder (a particular track), a head is changed to read this cylinder, the zone servo type magnetic disk device might not correctly demodulate the position of the head due to reading the servo data of a cylinder different from this cylinder.

BRIEF DESCRIPTION OF THE DRAWINGS

FIG. 1 is a schematic diagram illustrating an example of a configuration of a magnetic disk device 1 according to an embodiment.

FIG. 5 is a schematic diagram illustrating an example of a servo sector.

FIG. 6 is a plan view illustrating an example of the arrangement of servo tracks of a non-eccentric disk.

FIG. 8 is a plan view illustrating an example of the arrangement of servo tracks and virtual servo tracks to an eccentric disk.

FIG. 9 is a block diagram illustrating an example of a servo control system according to an embodiment.

FIG. 10 is a plan view illustrating an example of virtual circle control.

FIG. 15 is a schematic diagram illustrating an example of a servo gate in the case in which timing is not corrected.

FIG. 16 is a schematic diagram illustrating an example of a servo gate in the case in which timing is corrected at the time of head change.

FIG. 19 is a schematic diagram illustrating an example of a table of eccentricity compensation current values corresponding to a particular head HD.

FIG. 20 is a schematic diagram illustrating an example of a table of DFT coefficients corresponding to head-to-head relative positions of two heads HD before and after a head change.

FIG. 21 is a flowchart illustrating an example of a head change processing method according to an embodiment.

FIG. 24 is a flowchart illustrating an example of a correction processing method for a servo zone according to an embodiment.

FIG. 25 is a flowchart illustrating an example of an interrupt processing method for each sample according to an embodiment.

DETAILED DESCRIPTION

Figure 2:
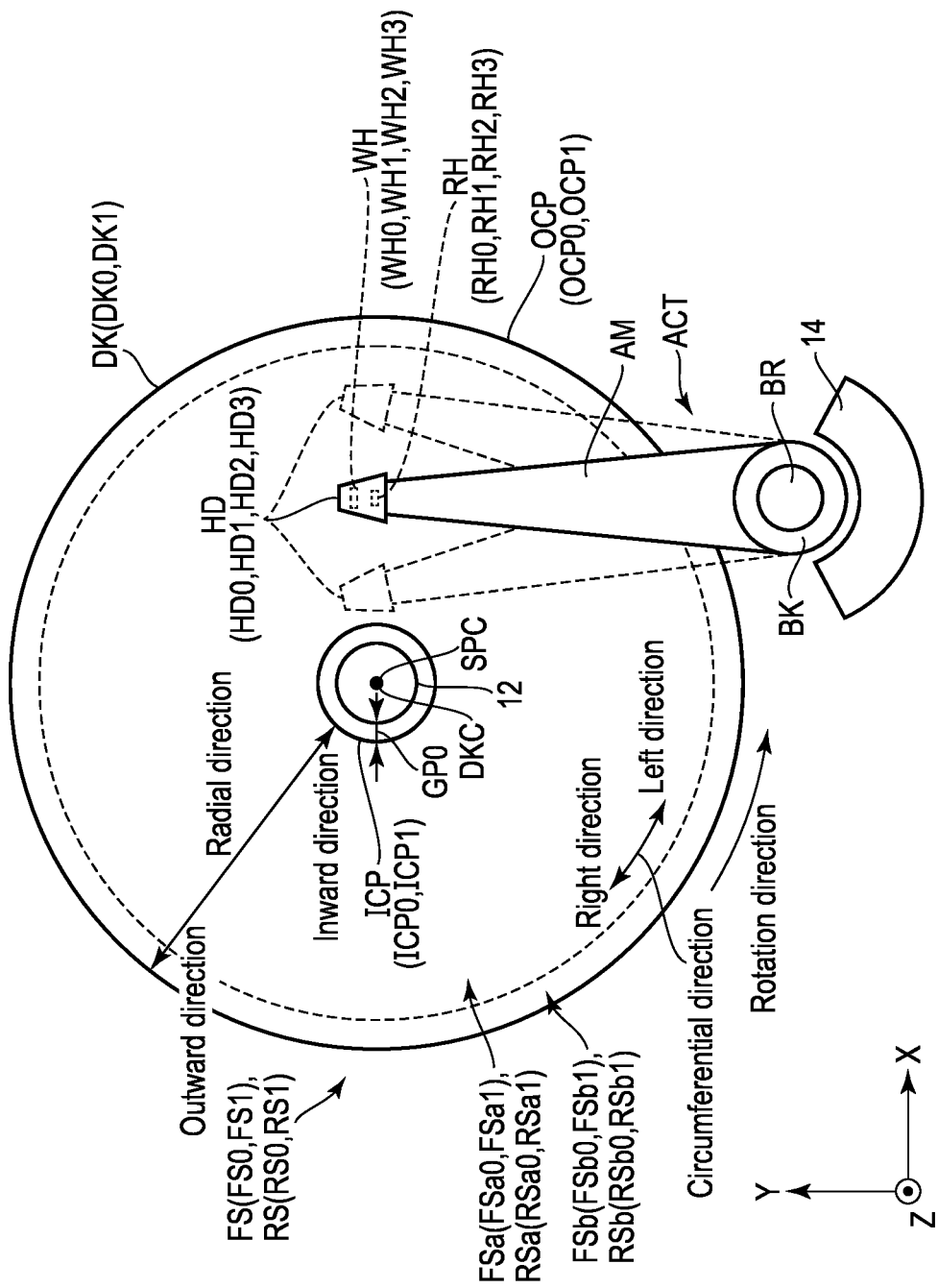
FIG. 2 is a plan view illustrating an example of the arrangement of a head to a disk.

In general, according to one embodiment, a magnetic disk device comprises: a first disk including a plurality of first servo wedges divided into a first zone and a second zone at a boundary in a radial direction, the first servo wedges having a first servo pattern arranged in the first zone and a second servo pattern arranged in the second zone; a second disk divided into the first zone and the second zone at the boundary in the radial direction, the second disk including a plurality of second servo wedges having the first servo pattern and the second servo pattern, the second disk having a second center position shifted from a first center position of the first disk; and a first head which writes data to the first disk and reads data from the first disk; a second head which writes data to the second disk and reads data from the second disk; and a controller which calculates an estimated position at which the second head is estimated to be disposed on the second disk based on first relative position information related to a relative position in a radial direction between the first head and the second head when the first head is switched to the second head.

In the following, an embodiment will be described with reference to the drawings. It should be noted that the drawings are merely examples, and do not limit the scope of the invention.

Embodiment

FIG. 1 is a schematic diagram illustrating an example of a configuration of a magnetic disk device 1 according to an embodiment.

The magnetic disk device 1 includes a housing HS, a head disk assembly (HDA) 10, a driver IC 20, a head amplifier integrated circuit (in the following, a head amplifier IC or a preamplifier) 30, a volatile memory 70, a nonvolatile memory 80, a buffer memory (buffer) 90, and a system controller 130 that is a one-chip integrated circuit. The magnetic disk device 1 is connected to a host system (in the following, simply referred to as a host) 100. FIG. 1 illustrates a cross section of the housing HS and the HDA 10.

The housing HS has a bottom wall HSB. Although FIG. 1 illustrates the housing HS having only the bottom wall HSB, actually, the housing HS has, for example, the bottom wall HSB, a side wall erected along a circumferential edge of the bottom wall HSB, and a cover that closes the opening of a base formed of the bottom wall HSB and the side wall.

The HDA 10 includes a magnetic disk (in the following, referred to as a disk) DK, a head HD, a spindle motor (in the following, referred to as SPM) 13 that rotates a spindle 12, an arm AM, an actuator block BK, a voice coil motor (in the following, referred to as VCM) 14, and a micro actuator (in the following, referred to as MA) 15 on which the head HD is mounted. The arm AM, the actuator block BK, the VCM 14, and the MA 15 constitute an actuator ACT. The actuator ACT is controlled to move head HD mounted on the MA 15 to a particular position of the disk DK by driving the VCM 14. It should be noted that the HDA 10 does not necessarily have to include the MA 15. In the case in which the HDA 10 does not have the MA 15, the head HD may be mounted on the arm AM. In the case in which the HDA 10 does not have the MA 15, the arm AM, the actuator block BK, and the VCM 14 constitute the actuator ACT. In this case, the actuator ACT is controlled to move the head HD mounted on the arm AM to a particular position of the disk DK by driving the VCM 14.

The SPM 13 is attached to the bottom wall HSB. At the center part of the SPM 13, the spindle 12 is attached. The disk DK has a plurality of disks DK. The disk DK is attached to the spindle 12 and rotates by the drive of the SPM 13. The disk DK has a front surface (top surface) FS and a back surface (lower surface) RS opposite to the front surface (top surface) FS. In the following, the front surface (top surface) FS and/or the back surface (lower surface) RS are sometimes simply referred to as a disk DK. In the example illustrated in FIG. 1, the disk DK has disks DK0 and DK1. The disks DK0 and DK1 are attached to the spindle 12. The disk DK1 is disposed between the disk DK0 and the bottom wall HSB, for example. The disk DK0 has a top surface FS0 and a lower surface RS0 opposite to the top surface FS0. The disk DK1 has a top surface FS1 and a lower surface RS1 opposite to the top surface FS1. It should be noted that the disk DK may have three or more disks. In the following, a direction along the circumference of the disk DK is referred to as a circumferential direction, and a direction orthogonal to the circumferential direction on the top surface FS and the lower surface RS of the disk DK is referred to as a radial direction. The radial direction corresponds to a direction toward the inner circumferential side and the outer circumferential side on the top surface FS and the lower surface RS of the disk DK.

The head HD has a plurality of heads HD. The head HD faces the disk DK. The head HD has a write head WH that writes data to the disk DK and a read head RH that reads data written on the disk DK. In the following, "writing data to the disk DK" is sometimes referred to as "write" or "write processing", and "reading data from the disk DK" is sometimes referred to as "read" or "read processing". In addition, "recording data in a particular recording area", "reading data from a particular recording area", "arranging the head HD at a particular position of the disk DK", "writing data to a particular area of the disk DK", "reading data from a particular area of the disk DK", "communicably connecting to a particular area", and the like are sometimes referred to as "accessing". In the example illustrated in FIG. 1, the head HD has heads HD0, HD1, HD2, and HD3. The head HD0 faces the top surface FS0 of the disk DK0, for example. The head HD0 has a write head WH0 that writes data to the top surface FS0 and a read head RH0 that reads data written on the top surface FS0. The head HD1 faces the lower surface RS0 of the disk DK0, for example. The head HD1 has a write head WH1 that writes data to the lower surface RS0 and a read head RH1 that reads data written on the lower surface RS0. The head HD2 faces the top surface FS1 of the disk DK1, for example. The head HD2 has a write head WH2 that writes data to the top surface FS1 and a read head RH2 that reads data written on the top surface FS1. The head HD3 faces the lower surface RS1 of the disk DK1, for example. The head HD3 has a write head WH3 that writes data to the lower surface RS1 and a read head RH3 that reads data written on the lower surface RS1. It should be noted that the head HD may have three or less heads or five or more heads.

The actuator block BK is rotatably attached to a bearing BR erected on the bottom wall HSB.

The arm AM includes a plurality of arms AM. In the arm AM, the tip end part on the disk DK side and the other end part on the opposite side to are connected to the actuator block BK. It should be noted that a suspension may be attached to the arm AM. In the example illustrated in FIG. 1, the arm AM has arms AM0, AM1, AM2, and AM3. The arm AM0 is provided on the top surface FS0 side of the disk DK0, for example. In other words, the arm AM0 is disposed so as to face the top surface FS0. In the arm AM0, the tip end part on the disk DK0 side and the other end part on the opposite side are connected to the actuator block BK. The arm AM1 is provided on the lower surface RS0 side of the disk DK0, for example. In other words, the arm AM1 is disposed so as to face the lower surface RS0. In the arm AM1, the tip end part on the disk DK0 side and the other end part on the opposite side are connected to the actuator block BK. The arm AM2 is provided on the top surface FS1 side of the disk DK1, for example. In other words, the arm AM2 is disposed so as to face the top surface FS1. In the arm AM2, the tip end part on the disk DK1 side and the other end part on the opposite side are connected to the actuator block BK. The arm AM3 is provided on the lower surface RS1 side of the disk DK1, for example. In other words, the arm AM3 is disposed so as to face the lower surface RS1. In the arm AM3, the tip end part on the disk DK1 side and the other end part on the opposite side are connected to the actuator block BK. It should be noted that the arm AM may have three or less arms, or may have five or more arms. In the case in which the HDA 10 does not have the MA 15, the arm AM has the head HD mounted on the tip end part.

For example, the head HD0 may be mounted on the tip end part of the arm AM0, the head HD1 may be mounted on the tip end part of the arm AM1, the head HD2 may be mounted on the tip end part of the arm AM2, and the head HD3 may be mounted on the tip end part of the arm AM3.

The VCM 14 is connected to the actuator block BK on the side opposite to the arm AM.

The MA 15 includes a plurality of MAs 15. The MA 15 is attached to the tip end part of the arm AM. The MA 15 can be driven independently of the VCM 14. The MA 15 is attached to the suspension of arm AM, for example. In the MA 15, the head HD is mounted on a tip end part opposite to one end part connected to the arm AM. The MA 15 finely controls the operation of the head HD in the radial direction. For example, the MA 15 more finely controls the operation of the head HD in the radial direction than the operation of the head HD in the radial direction by the VCM 14. In the example illustrated in FIG. 1, the MA 15 includes an MA 150, an MA 151, an MA 152, and an MA 153. In the MA 150, for example, the other end part is connected to the tip end part of the arm AM0, and the head HD0 is mounted on the tip end part opposite to the other end part. In the MA 151, for example, the other end part is connected to the tip end part of the arm AM1, and the head HD1 is mounted on the tip end part opposite to the other end part. In the MA 152, for example, the other end part is connected to the tip end part of the arm AM2, and the head HD2 is mounted on the tip end part opposite to the other end part. In the MA 153, for example, the other end part is connected to the tip end part of the arm AM3, and the head HD3 is mounted on the tip end part opposite to the other end part. It should be noted that the MA 15 may have three or less MAs or five or more MAs according to the number of heads HD.

The actuator ACT is rotatably (or rotatable) attached to the bearing BR. The actuator ACT is formed of the arm AM, the actuator block BK, the VCM 14, and the MA 15. The actuator ACT drives the VCM 14 around the bearing BR and finely drives the MA 15 to position the head HD mounted on the MA 15 at a particular position on the disk DK. It should be noted that in the case in which the HDA 10 does not have the MA 15, the actuator ACT is formed of the arm AM, the actuator block BK, and the VCM 14. In this case, the actuator ACT drives the VCM 14 around the bearing BR to position the head HD mounted on the arm AM at a particular position on the disk DK. In the example illustrated in FIG. 1, the actuator ACT is formed of the MAs 150 to 153, the arms AM0 to AM3, the actuator block BK, and the VCM 14. The actuator ACT drives the VCM 14 around the rotation axis of the bearing BR and finely drives the MAs 150 to 153 to position the head HD0 mounted on the MA 150 at a particular position on the top surface FS0, position the head HD1 mounted on the MA 151 at a particular position on the lower surface RS0, position the head HD2 mounted on the MA 152 at a particular position on the top surface FS1, and position the head HD3 mounted on the MA 153 at a particular position on the lower surface RS0. In the case in which the HDA 10 does not have the MA 15, the actuator ACT drives the VCM 141 around the rotation axis of the bearing BR to position the head HD0 mounted on the arm AM0 at a particular position on the top surface FS0, position the head HD1 mounted on the arm AM1 at a particular position on the lower surface RS0, position the head HD2 mounted on the arm AM2 at a particular position on the top surface FS1, and position the head HD3 mounted on the arm AM3 at a particular position on the lower surface RS1.

FIG. 2 is a plan view illustrating an example of the arrangement of the head HD to the disk DK. FIG. 2 illustrates a first direction X, a second direction Y, and a third direction Z. In one example, although the first direction X, the second direction Y, and the third direction Z are orthogonal to each other, these directions may intersect with each other at an angle other than an angle of 90°. In FIG. 2, the top surface FS (FS0, FS1) and the lower surface RS (RS0, RS1) of the disk DK (DK0, DK1) extend on the X-Y plane. As illustrated in FIG. 2, a direction toward an outermost circumference OCP (OCP0, OCP1) of the disk DK in the radial direction is sometimes referred to as an outward direction (outer side), and a direction toward an innermost circumference ICP (ICP0, ICP1) of the disk DK, i.e., a direction opposite to the outward direction is sometimes referred to as an inward direction (inner side). As illustrated in FIG. 2, in the circumferential direction, a clockwise (clockwise) direction to the disk DK is sometimes referred to as a right direction, and a direction opposite to the clockwise (counterclockwise) direction is sometimes referred to as a left direction. In the circumferential direction, a direction in which the disk DK rotates is sometimes referred to as a rotation direction. It should be noted that in the example illustrated in FIG. 2, although the rotation direction is indicated by the left direction (counterclockwise direction), the rotation direction may be the opposite direction (right direction or clockwise direction). FIG. 2 illustrates a center (in the following, sometimes referred to as a disk center) DKC (DKC0, DKC1) of the disk DK (DK0, DK1) and a (rotation) center (in the following, sometimes referred to as a rotation center) SPC of the spindle 12. The disk center DKC (DKC0, DKC1) and the rotation center SPC extend along the third direction Z, for example. In FIG. 2, the disk center DKC (DKC0, DKC1) is matched with the rotation center SPC. Terms such as "the same", "identical", "matching", and "equivalent" include not only the meaning of being exactly the same but also the meaning of being different to such an extent that they can be regarded as being substantially the same. The disk center DKC and the rotation center SPC does not necessarily have to be matched with each other. In other words, the disk center DKC and the rotation center SPC may be displaced from each other. In FIG. 2, a gap GP0 is generated between the innermost circumference ICP (ICP0, ICP1) of the disk DK (DK0, DK1) and the spindle 12. It should be noted that the gap GP0 does not necessarily have to be formed between the innermost circumference IPC (ICP0, ICP1) of the disk DK (DK0, DK1) and the spindle 12.

On the top surface FS and the lower surface RS of the disk DK, user data regions FSa and RSa available for the user and system areas FSb and RSb for writing information (in the following, sometimes referred to as system information) necessary for system management are allocated to regions in which the data is writable. In the following, a particular position in the radial direction of the top surface FS and the lower surface RS of the disk DK is sometimes referred to as a radial position, and a particular position in the circumferential direction of the top surface FS and a particular position the lower surface RS of the disk DK are sometimes referred to as a circumferential position. The radial position and the circumferential position are sometimes collectively simply referred to as a position. For example, the radial position corresponds to a radial position of a track or a sector (data sector), and the circumferential position corresponds to a circumferential position of the sector in a particular track. For example, the position corresponds to the position of the sector (data sector) on the top surface FS and the lower surface RS of the disk DK. The position of the sector (data sector) can be indicated by at least one of a cylinder (track)

number including a particular sector, a head number of the head HD accessing the particular sector, a sector number of the particular sector, a radial position of the particular sector on the top surface FS and the lower surface RS of the disk DK, and a disk angle of the particular sector. For example, the position of the sector is indicated by a combination of two of a cylinder (track) number including a particular sector, a head number of the head HD accessing the particular sector, a sector number of the particular sector, a radial position of the particular sector in the disk DK, and a disk angle of the particular sector.

The top surface FS and the lower surface RS of the disk DK are divided into a plurality of regions (in the following, sometimes referred to as a zone or a zone area) for each particular range in the radial direction. The zone can include a plurality of tracks arranged in the radial direction. The track can include a plurality of sectors arranged in a circumferential direction. It should be noted that the "track" is used as one region in a plurality of regions obtained by dividing the top surface FS and the lower surface RS of the disk DK for each particular range in the radial direction, a path of the head HD corresponding to a particular radial position of the top surface FS and the lower surface RS of the disk DK, data extending in the circumferential direction in a particular radial direction of the top surface FS and the lower surface RS of the disk DK, data for one round written on a particular track of the top surface FS and the lower surface RS of the disk DK, data written on a particular track of the top surface FS and the lower surface RS of the disk DK, and various other meanings. The "sector" is used as one region in a plurality of regions obtained by dividing particular tracks of the top surface FS and the lower surface RS of the disk DK in the circumferential direction, data written at a particular circumferential position at a particular radial position of the top surface FS and the lower surface RS of the disk DK, data written in a particular sector of the top surface FS and the lower surface RS of the disk DK, and various other meanings. The "radial width of the track" is sometimes referred to as a "track width". The "radial width of the sector" is sometimes referred to as a "sector width". In the following, a path passing the center position of the track width at each circumferential position of a particular track is sometimes referred to as a track center.

In the example illustrated in FIG. 2, to the top surface FS0 of the disk DK0, a user data region FSa0 and a system area FSb0 are allocated. To the lower surface RS0 of the disk DK0, a user data region RSa0 and a system area RSb0 are allocated. To the top surface FS1 of the disk DK1, a user data region FSa1 and a system area FSb1 are allocated. To the lower surface RS1 of the disk DK1, a user data region RSa1 and a system area RSb1 are allocated.

For example, at the time of seeking, the actuator ACT rotates around the bearing BR, and the head HD slides in the horizontal plane of the disk DK. In the example illustrated in FIG. 2, at the time of seeking, for example, the actuator ACT rotates around the bearing BR, and the head HD0 slides on the top surface FS0 of the disk DK0. For example, at the time of seeking, the actuator ACT rotates around the bearing BR, and the head HD1 slides on the lower surface RS0 of the disk DK0. For example, at the time of seeking, the actuator ACT rotates around the bearing BR, and the head HD2 slides on the top surface FS1 of the disk DK1. For example, at the time of seeking, the actuator ACT rotates around the bearing BR, and the head HD3 slides on the lower surface RS1 of the disk DK1.

Figure 3:
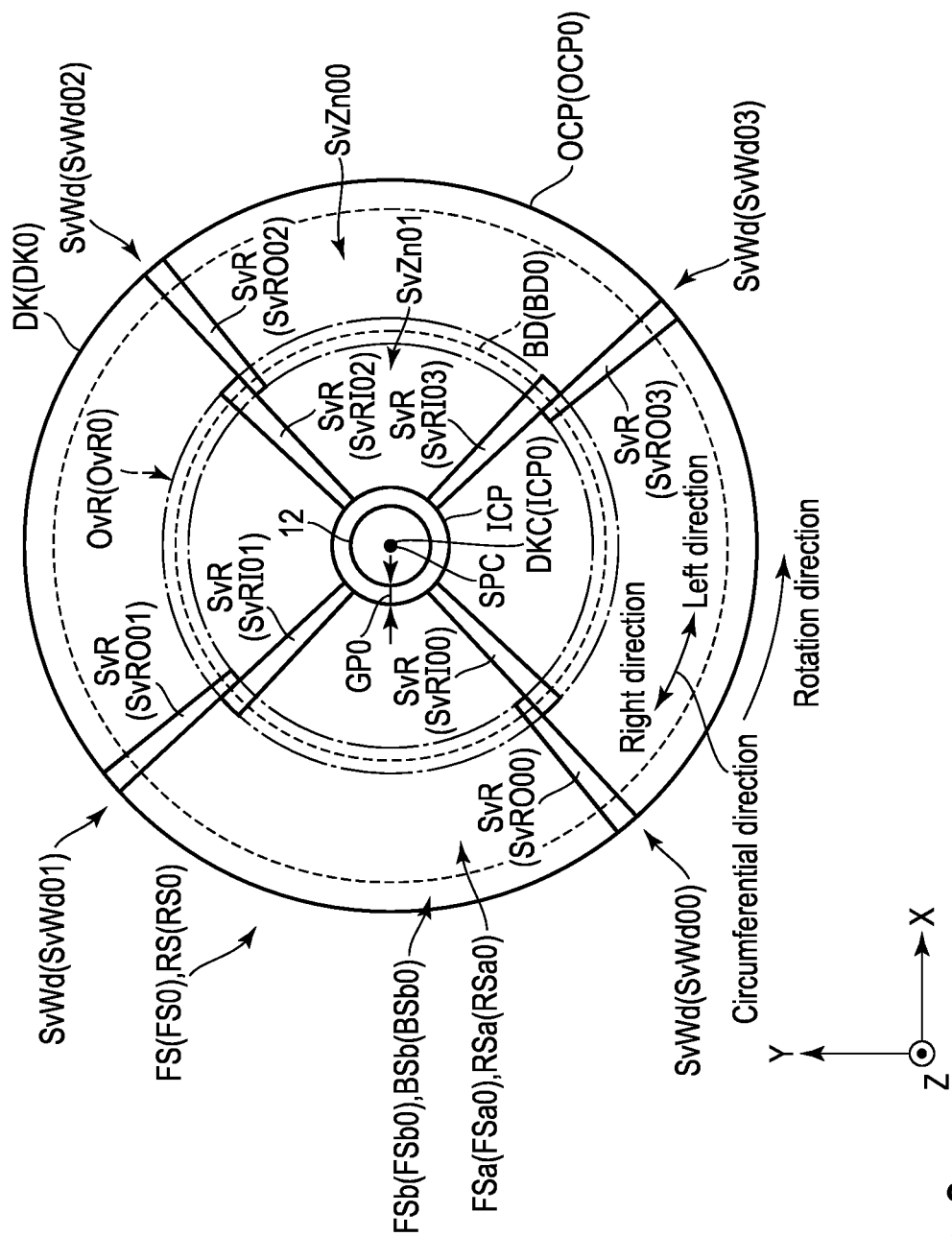
FIG. 3 is a plan view illustrating an example of the arrangement of servo wedges of a disk according to an embodiment.

FIG. 3 is a plan view illustrating an example of the arrangement of the servo wedges SvWd of the disk DK0 according to the present embodiment. In FIG. 3, the disk center DKC0 of the disk DK0 and the rotation center SPC are matched with each other. In FIG. 3, a gap GP0 is generated between the innermost circumference ICP0 of the disk DK0 and the spindle 12. It should be noted that the gap GP0 does not necessarily have to be generated between the innermost circumference ICP0 of the disk DK0 and the spindle 12.

The user data region FSa of the top surface FS and the user data region RSa of the lower surface RS of the disk DK are divided into a plurality of zones (in the following, sometimes referred to as a servo zone) at respective boundaries BD in the radial direction. The top surface FS and the lower surface RS of the disk DK have a plurality of servo wedges SvWd. On the top surface FS and the lower surface RS of the disk DK, user data is writable in a region other than the plurality of servo wedges SvWd. The plurality of servo wedges SvWd is disposed at intervals in the circumferential direction on the top surface FS and the lower surface RS of the disk DK. The servo wedge SvWd is formed of a plurality of servo regions SvR arranged in the radial direction of the top surface FS and the lower surface RS of the disk DK. For example, the servo wedge SvWd includes a plurality of servo regions SvR arranged in a staggered manner in the radial direction of the disk DK. In the servo wedge SvWd, each servo region SvR is arranged for each zone. In the servo wedge SvWd, a plurality of servo regions SvR is arranged in an overlapping manner in the radial direction. For example, in the servo wedge SvWd, a plurality of servo regions SvR is arranged in an overlapping manner in the vicinity of the boundary BD of the zone. In the following, in the servo wedge SvWd, a radial region in which the plurality of servo regions SvR is arranged in an overlapping manner is sometimes referred to as an overlap region OvR. The overlap region OvR corresponds to a region in which a plurality of servo regions SvR is arranged in the circumferential direction in the servo wedge SvWd. For example, the overlap region OvR may include the boundary BD. It should be noted that the overlap region OvR does not necessarily have to include the boundary BD. In the following, one servo region SvR in a particular track is sometimes referred to as a "servo sector". It should be noted that the "servo region" is sometimes referred to as a "servo sector". The servo sector includes servo data. The data pattern forming the servo data is sometimes referred to as a servo pattern. It should be noted that the "servo region in which the servo data is written", the "servo sector in which the servo data is written", and the like are sometimes referred to as "servo data", "servo sector", "servo pattern", or "servo region".

In the example illustrated in FIG. 3, the user data region FSa0 of the top surface FS0 and the user data region RSa0 of the lower surface RS0 of the disk DK0 are divided at a boundary BD0 into the servo zone SvZn00 and the servo zone SvZn01 in the radial direction. The servo zone SvZn00 is disposed on the outer side from the servo zone SvZn01. In other words, the servo zone SvZn01 is disposed on the inner side from the servo zone SvZn00. The top surface FS0 and the lower surface RS0 of the disk DK0 have servo wedges SvWd00, SvWd01, SvWd02, and SvWd03. The servo wedges SvWd00 to SvWd03 are disposed at intervals in the circumferential direction on the top surface FS0 and the lower surface RS0 of the disk DK0.

The servo wedge SvWd00 has a servo region SvRI00 and a servo region SvRO00. The servo region SvRI00 is disposed on the inner side from the servo region SvRO00. The servo region SvRI00 is disposed in the servo zone SvZn01.

The servo region SvRI00 is disposed from the innermost circumference ICP0 side of the top surface FS0 and the lower surface RS0 to the boundary BD0, and reaches the outer side slightly from the boundary BD0. The servo region SvRO00 is disposed on the outer side from the servo region SvRI00. The servo region SvRO00 is disposed in the servo zone SvZn00. The servo region SvRO00 is disposed from the outermost circumference OCP (OCP0) side of the top surface FS0 and the lower surface RS0 to the boundary BD0, and reaches the inner side slightly from the boundary BD0. The servo regions SvRI00 and SvRO00 are arranged in the circumferential direction in the overlap region OvR0.

The servo wedge SvWd01 has a servo region SvRI01 and a servo region SvRO01. The servo region SvRI01 is disposed on the inner side from the servo region SvRO01. The servo region SvRI01 is disposed in the servo zone SvZn01. The servo region SvRI01 is disposed from the innermost circumference ICP0 side of the top surface FS0 and the lower surface RS0 to the boundary BD0, and reaches the outer side slightly from the boundary BD0. The servo region SvRO01 is disposed on the outer side from the servo region SvRI01. The servo region SvRO01 is disposed in the servo zone SvZn00. The servo region SvRO01 is disposed from the outermost circumference OCP (OCP0) side of the top surface FS0 and the lower surface RS0 to the boundary BD0, and reaches the inner side slightly from the boundary BD0. The servo regions SvRI01 and SvRO01 are arranged in the circumferential direction in the overlap region OvR0.

The servo wedge SvWd02 has a servo region SvRI02 and a servo region SvRO02. The servo region SvRI02 is disposed on the inner side from the servo region SvRO02. The servo region SvRI02 is disposed in the servo zone SvZn01. The servo region SvRI02 is disposed from the innermost circumference ICP0 side of the top surface FS0 and the lower surface RS0 to the boundary BD0, and reaches the outer side slightly from the boundary BD0. The servo region SvRO02 is disposed on the outer side from the servo region SvRI02. The servo region SvRO02 is disposed in the servo zone SvZn00. The servo region SvRO02 is disposed from the outermost circumference OCP (OCP0) side of the top surface FS0 and the lower surface RS0 to the boundary BD0, and reaches the inner side slightly from the boundary BD0. The servo regions SvRI02 and SvRO02 are arranged in the circumferential direction in the overlap region OvR0.

The servo wedge SvWd03 has a servo region SvRI03 and a servo region SvRO03. The servo region SvRI03 is disposed on the inner side from the servo region SvRO03. The servo region SvRI03 is disposed in the servo zone SvZn01. The servo region SvRI03 is disposed from the innermost circumference ICP0 side of the top surface FS0 and the lower surface RS0 to the boundary BD0, and reaches the outer side slightly from the boundary BD0. The servo region SvRO03 is disposed on the outer side from the servo region SvRI03. The servo region SvRO03 is disposed in the servo zone SvZn00. The servo region SvRO03 is disposed from the outermost circumference OCP (OCP0) side of the top surface FS0 and the lower surface RS0 to the boundary BD0, and reaches the inner side slightly from the boundary BD0. The servo regions SvRI03 and SvRO03 are arranged in the circumferential direction in the overlap region OvR0.

Figure 4:
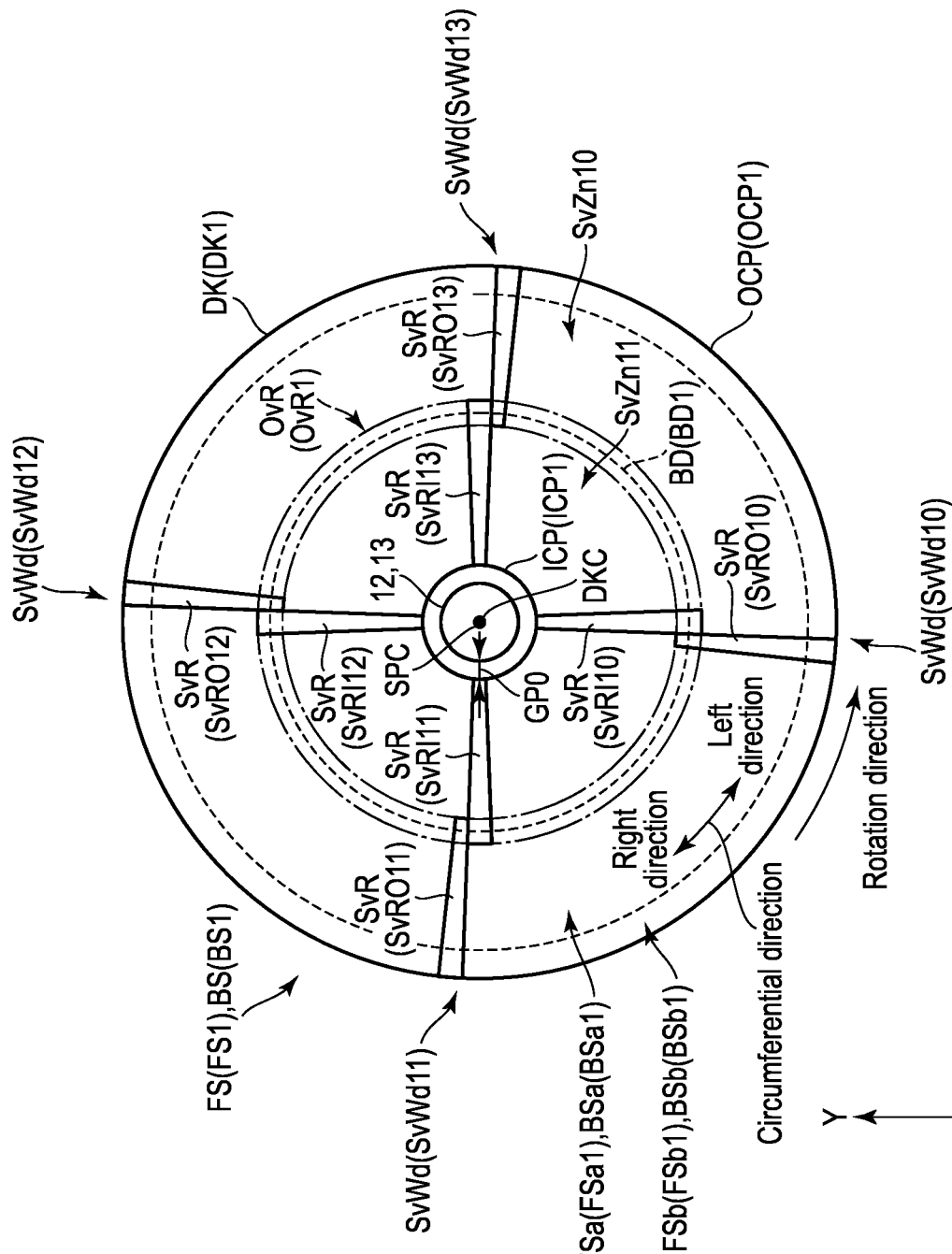
FIG. 4 is a plan view illustrating an example of the arrangement of servo wedges of a disk according to an embodiment.

FIG. 4 is a plan view illustrating an example of the arrangement of the servo wedges SvWd of the disk DK1 according to the present embodiment. In FIG. 4, the disk center DKC1 of the disk DK1 and the rotation center SPC are matched with each other. In FIG. 4, a gap GP0 is generated between the innermost circumference ICP1 of the disk DK1 and the spindle 12. It should be noted that the gap GP0 does not necessarily have to be generated between the innermost circumference ICP1 of the disk DK0 and the spindle 12.

In the example illustrated in FIG. 4, the user data region FSa1 of the top surface FS1 and the user data region RSa1 of the lower surface RS1 of the disk DK1 are divided at the boundary BD1 into the servo zone SvZn10 and the servo zone SvZn11 in the radial direction. The servo zone SvZn10 is disposed on the outer side from the servo zone SvZn11. In other words, the servo zone SvZn11 is disposed on the inner side from the servo zone SvZn10. The top surface FS1 and the lower surface RS1 of the disk DK1 have servo wedges SvWd10, SvWd11, SvWd12, and SvWd13. The servo wedges SvWd10 to SvWd13 are disposed at intervals in the circumferential direction on the top surface FS1 and the lower surface RS1 of the disk DK1.

The servo wedge SvWd10 has a servo region SvRI10 and a servo region SvRO10. The servo region SvRI10 is disposed on the inner side from the servo region SvRO10. The servo region SvRI10 is disposed in the servo zone SvZn11. The servo region SvRI10 is disposed from the innermost circumference ICP1 side of the top surface FS1 and the lower surface RS1 to the boundary BD1, and reaches the outer side slightly from the boundary BD1. The servo region SvRO10 is disposed on the outer side from the servo region SvRI10. The servo region SvRO10 is disposed in the servo zone SvZn10. The servo regions SvRO10 are disposed from the outermost circumference OCP (OCP1) side of the top surface FS1 and the lower surface RS1 to the boundary BD1, and reach the inner side slightly from the boundary BD1. The servo regions SvRI10 and SvRO10 are arranged in the circumferential direction in the overlap region OvR1.

The servo wedge SvWd11 has a servo region SvRI11 and a servo region SvRO11. The servo region SvRI11 is disposed on the inner side from the servo region SvRO11. The servo region SvRI11 is disposed in the servo zone SvZn11. The servo region SvRI11 is disposed from the innermost circumference ICP1 side of the top surface FS1 and the lower surface RS1 to the boundary BD1, and reaches the outer side slightly from the boundary BD1. The servo region SvRO11 is disposed on the outer side from the servo region SvRI11. The servo region SvRO11 is disposed in the servo zone SvZn10. The servo regions SvRO11 are disposed from the outermost circumference OCP (OCP1) side of the top surface FS1 and the lower surface RS1 to the boundary BD1, and reach the inner side slightly from the boundary BD1. The servo regions SvRI11 and SvRO11 are arranged in the circumferential direction in the overlap region OvR1.

The servo wedge SvWd12 has a servo region SvRI12 and a servo region SvRO12. The servo region SvRI12 is disposed on the inner side from the servo region SvRO12. The servo region SvRI12 is disposed in the servo zone SvZn11. The servo region SvRI12 is disposed from the innermost circumference ICP1 side of the top surface FS1 and the lower surface RS1 to the boundary BD1, and reaches the outer side slightly from the boundary BD1. The servo region SvRO12 is disposed on the outer side from the servo region SvRI12. The servo region SvRO12 is disposed in the servo zone SvZn10. The servo regions SvRO12 are disposed from the outermost circumference OCP (OCP1) side of the top surface FS1 and the lower surface RS1 to the boundary BD1, and reach the inner side slightly from the boundary BD1. The servo regions SvRI12 and SvRO12 are arranged in the circumferential direction in the overlap region OvR1.

The servo wedge SvWd13 has a servo region SvRI13 and a servo region SvRO13. The servo region SvRI13 is disposed on the inner side from the servo region SvRO13. The servo region SvRI13 is disposed in the servo zone SvZn11. The servo region SvRI13 is disposed from the innermost circumference ICP1 side of the top surface FS1 and the lower surface RS1 to the boundary BD1, and reaches the outer side slightly from the boundary BD1. The servo region SvRO13 is disposed on the outer side from the servo region SvRI13. The servo region SvRO13 is disposed in the servo zone SvZn10. The servo regions SvRO13 are disposed from the outermost circumference OCP (OCP1) side of the top surface FS1 and the lower surface RS1 to the boundary BD1, and reach the inner side slightly from the boundary BD1. The servo regions SvRI13 and SvRO13 are arranged in the circumferential direction in the overlap region OvR1.

FIG. 5 is a schematic diagram illustrating an example of the servo sector SvC. FIG. 5 illustrates a particular servo sector SvC of a particular track TRe. As illustrated in FIG. 5, in the circumferential direction, a direction in which data is written and read is referred to as a traveling direction. For example, the traveling direction is opposite to the rotation direction of the disk DK. It should be noted that the traveling direction may be the same direction as the rotation direction of the disk DK. In FIG. 5, for convenience of description, although the track TRe is shown in a band shape extending in the circumferential direction in a track width, the track TRe is actually curved along the circumferential direction.

The servo sector SvC includes a preamble, a servo address mark (SAM), a sector/cylinder, a burst, and a post code, for example. The preamble, the servo address mark, the sector/cylinder, the burst, and the post code are disposed in this order. The preamble includes preamble information to be synchronized with reading a servo pattern including a servo address mark, a sector/cylinder, and the like. The servo address mark includes servo address mark information indicating the start of the servo pattern. The sector/cylinder is formed of an address (cylinder address) of a particular cylinder (track) and an address of a servo sector of the particular cylinder (track). The burst is data (relative position data) used to detect a positional displacement (position error) in the radial direction and/or the circumferential direction of the head HD to the track center of a particular track (cylinder), and is formed of a repetitive pattern of a particular cycle. The burst data is written in a data pattern in which the phase of the burst data is inverted by an angle of 180° in one servo track cycle in the radial direction of the disk DK. In other words, the phase of the waveform of the burst data calculated by demodulating the particular burst data using discrete Fourier transform (DFT) and any other method, for example, is inverted by an angle of 180° to the phase of the adjacent burst data calculated by demodulating the particular burst data adjacent in the radial direction of the burst data (in the following, referred to as adjacent burst data). The term "adjacent" includes not only data, an object, a region, a space, and any other component being arranged in contact with each other, but also being arranged at a particular interval. The servo track (servo cylinder) corresponds to a track to be subjected to write processing or read processing in response to a command from the host 100 and any other component. The servo track corresponds to a track defined by a servo pattern written on the top surface FS and the lower surface RS of the disk DK by self-servo write (SSW) that writes a servo pattern in the magnetic disk device 1, servo write by multi-stack STW (MS-STW) that performs servo write on a large number of disks DK in a servo write dedicated device, or servo track write (STW). The burst data is used to acquire the radial and/or circumferential position (in the following, sometimes referred to as a head position) of the head HD in the disk DK, for example. The burst data includes an N burst (N Burst) and a Q burst (Q Burst), for example. The N burst and the Q burst are written in a data pattern in which phases are shifted from each other by an angle of 90° in the radial direction of the disk DK. In other words, the phase of the N burst and the phase of the Q burst are shifted from each other by an angle of 90° in the radial direction, for example. The post code PC includes a path concentric with the disk DK caused by blurring (repeated runout: RRO) synchronized with the rotation of the disk DK when servo data is written to the disk, for example, data (in the following, referred to as RRO correction data) for correcting an error caused by distortion of a track to a track center, and any other data. In the following, for convenience of description, an error due to track distortion to the track center caused by the RRO is sometimes simply referred to as an RRO.

In the following, the eccentricity of the disk DK will be described with reference to FIGS. 6, 7, and 8.

FIG. 6 is a plan view illustrating an example of the arrangement of the servo track SvTRe of a non-eccentric disk DK. FIG. 6 illustrates an axis AX1 extending along the first direction X and passing the disk center DKC and an axis AX2 extending along the second direction Y orthogonal to the axis AX1 and passing the disk center DKC. FIG. 6 illustrates the servo track SvTRe of the disk DK.

In the example illustrated in FIG. 6, the disk DK is not eccentric to the spindle 12. In other words, the disk center DKC of the disk DK is matched with the rotation center SPC. The servo track SvTRe is disposed concentrically with the disk center DKC and the rotation center SPC.

Figure 7:
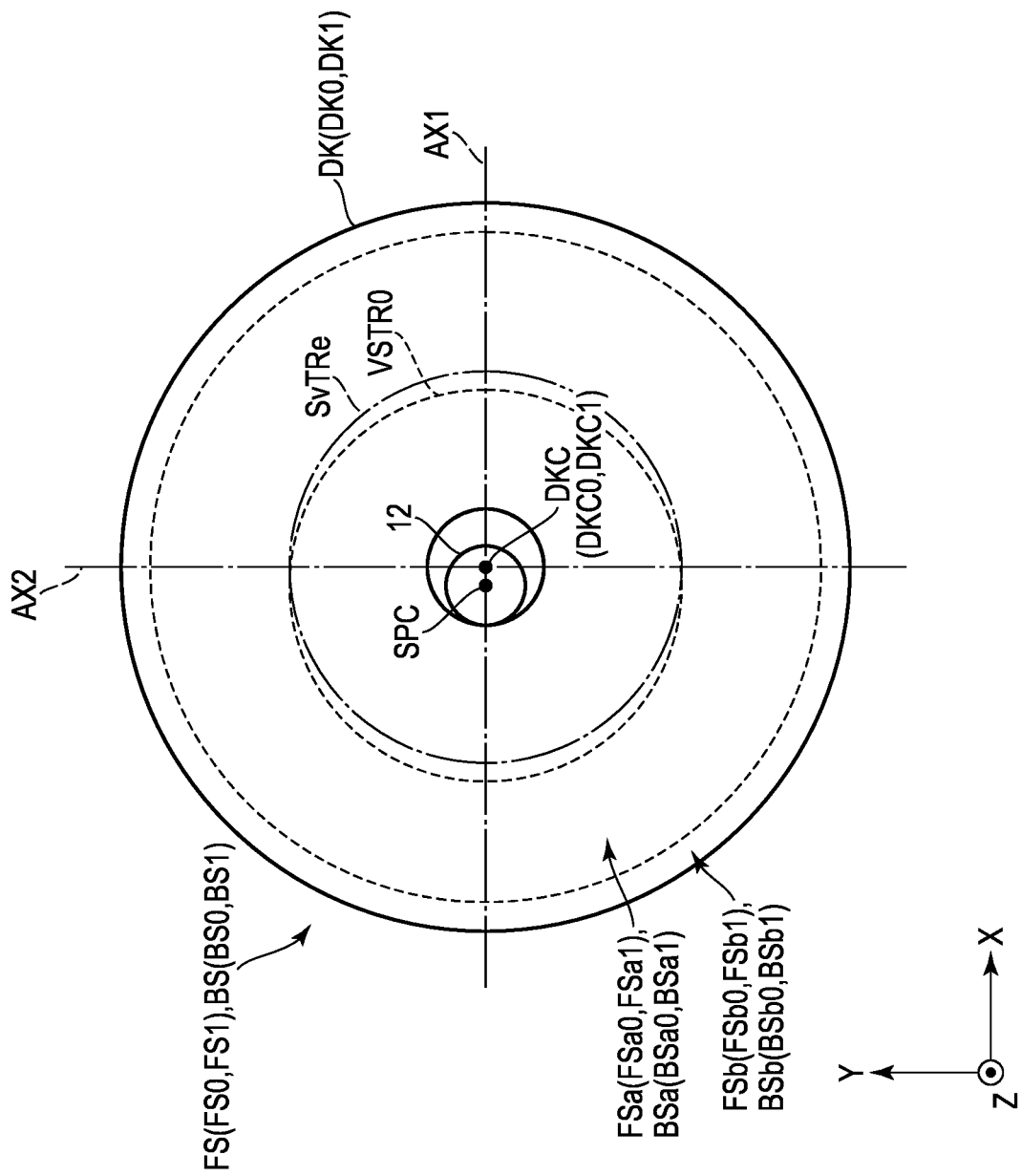
FIG. 7 is a plan view illustrating an example of the arrangement of servo tracks and virtual servo tracks to an eccentric disk.

FIG. 7 is a plan view illustrating an example of the arrangement of the servo track SvTRe and the virtual servo track VSTR0 to the eccentric disk DK. FIG. 7 illustrates the servo track SvTRe of the disk DK and a virtual servo track (in the following, the virtual servo track sometimes referred to as a virtual servo track) VSTR0 to the disk DK.

In the example illustrated in FIG. 7, the disk DK is displaced (shifted) in the first direction X to the spindle 12. In other words, the disk center DKC of the disk DK is displaced (shifted) in the first direction X to the rotation center SPC. For example, the disk DK can be displaced (shifted) to the spindle 12 after the user starts using the disk DK after shipment. The term "displacement (shift) of the disk to the spindle 12" is sometimes referred to as "disk shift". "The displacement (shift) of the disk DK to the spindle 12 after the user starts use after shipment" is sometimes referred to as "subsequent disk shift". The subsequent disk shift can occur when the disk DK is shifted to the spindle 12 after the virtual circle calibration due to a gap between the hub diameter of the spindle 12 and the inner diameter of the disk DK, thermal expansion/contraction, and any other cause, for example. The servo track SvTRe is disposed concentrically with the disk center DKC. The virtual servo track VSTR0 is disposed concentrically with the rotation center SPC. The servo track SvTRe is displaced (shifted) in the first direction X to the virtual servo track VSTR0.

FIG. 8 is a plan view illustrating an example of the arrangement of the servo track SvTRe and the virtual servo tracks VSTR0 and VSTR1 to the eccentric disk DK. FIG. 8 illustrates the servo track SvTRe of the disk DK, the virtual servo track VSTR0, and the virtual servo track VSTR1 to the disk DK.

In the example illustrated in FIG. 8, the disk DK is displaced (shifted) in the direction opposite to the tip end side of the arrow in the first direction X and the tip end side of the arrow in the second direction Y to the spindle 12. In other words, the disk center DKC of the disk DK is displaced (shifted) to the direction opposite to the tip end side of the arrow in the first direction X and to the tip end side of the arrow in the second direction Y to the rotation center SPC. For example, the disk DK can be displaced (shifted) from the spindle 12 as a subsequent disk shift. The servo track SvTRe is disposed concentrically with the disk center DKC. The virtual servo track VSTR1 is disposed concentrically with the rotation center SPC. The servo track SvTRe is displaced (shifted) in the first direction X to the virtual servo track VSTR0. The servo track SvTRe is displaced (shifted) in the direction opposite to the tip end side of the arrow in the first direction X and the tip end side of the arrow in the second direction Y to the virtual servo track VSTR1.

The driver IC 20 controls the drive of the SPM 13 and the VCM 14 according to control of the system controller 130 (specifically, the MPU 50 or the HDC 60, described later). The driver IC 20 is electrically connected to the SPM 13 and the VCM 14. The driver IC 20 has an SPM control unit 210 and a VCM control unit 220. The SPM control unit 210 controls the rotation of the SPM 13. The VCM control unit 220 controls a current (or voltage) supplied to the VCM 14 to control the drive of the VCM 14. It should be noted that a part of the configuration of the driver IC 20 (for example, the SPM control unit 210 and the VCM control unit 220) may be provided in the system controller 130.

The head amplifier IC (preamplifier) 30 amplifies the read signal read from the disk DK and outputs the amplified read signal to the system controller 130 (specifically, a read/write (R/W) channel 40, described later). The head amplifier IC 30 is electrically connected to the heads HD, the heads HD0, HD1, HD2, and HD3, for example. The head amplifier IC 30 outputs a write current corresponding to the signal outputted from the R/W channel 40 to the head HD. The head amplifier IC 30 includes a head selection unit 310 and a signal detection unit 320. In the actuator ACT, the head selection unit 310 selects the write heads WH (WH0 to WH4) for writing data to the disk DK (DK0, DK1), and selects the read heads RH (RH0 to RH4) for reading data from the disk DK (DK0, DK1). The signal detection unit 320 detects a signal (write signal) written by the write head WH on the disk DK (DK0, DK1) and a signal (read signal) read by the read head RH1 from the disk DK (DK0, DK1). It should be noted that a part of the configuration of the head amplifier IC 30 (for example, the head selection unit 310 and the signal detection unit 320) may be provided in the system controller 130.

The volatile memory 70 is a semiconductor memory in which stored data is lost when power supply is cut off. The volatile memory 70 stores data and the like necessary for processing in the units of the magnetic disk device 1. The volatile memory 70 is a dynamic random access memory (DRAM) or a synchronous dynamic random access memory (SDRAM), for example. The volatile memory 70 has an eccentricity table that records information learning the eccentricity of the disk after the subsequent disk shift, e.g. the RRO. It should be noted that the volatile memory 70 does not necessarily have to have the eccentric table.

The nonvolatile memory 80 is a semiconductor memory that records stored data even though power supply is cut off. The nonvolatile memory 80 is a NOR type or NAND type flash read only memory (FROM), for example. The nonvolatile memory 80 has an eccentricity table that records information learning the eccentricity of the disk after the subsequent disk shift, e.g. the RRO. It should be noted that the nonvolatile memory 80 does not necessarily have to have the eccentric table.

The buffer memory 90 is a semiconductor memory that temporarily records data and the like transmitted and received between the magnetic disk device 1 and the host 100. It should be noted that the buffer memory 90 may be configured integrally with the volatile memory 70. The buffer memory 90 is a DRAM, a static random access memory (SRAM), an SDRAM, a ferroelectric random access memory (FeRAM), a magnetoresistive random access memory (MRAM), or any other device, for example.

The system controller (controller) 130 is implemented using a large-scale integrated circuit (LSI) called a system-on-a-chip (SoC) in which a plurality of elements is integrated on a single chip, for example. The system controller 130 includes a read/write (R/W) channel 40, a microprocessor (MPU) 50, and a hard disk controller (HDC) 60. The system controller 130 is electrically connected to the driver IC 20, the head amplifier IC 30, the volatile memory 70, the nonvolatile memory 80, the buffer memory 90, and the host system 100. It should be noted that the system controller 130 may have an SPM control unit 210, a VCM control unit 220, a head selection unit 310, and a signal detection unit 320. The system controller 130 may include the driver IC 20 and the head amplifier IC 30.

The R/W channel 40 executes signal processing of read data transferred from the disk DK to the host 100 and write data transferred from the host 100 according to an instruction from the MPU 50, described later. The R/W channel 40 has a circuit or a function of measuring signal quality of read data. The R/W channel 40 is electrically connected to, for example, the head amplifier IC 30, the MPU 50, the HDC 60, and any other component.

The MPU 50 is a main controller that controls the units of the magnetic disk device 1 in accordance with an instruction from the host 100 or any other device. The MPU 50 controls the actuator ACT through the driver IC 20 and executes servo control for positioning the head HD. The MPU 50 controls the write operation of data to the disk DK and selects a storage destination of the write data. The MPU 50 controls the read operation of data from the disk DK and controls processing of the read data. The MPU 50 is connected to the units of the magnetic disk device 1. The MPU 50 is electrically connected to the driver IC 20, the R/W channel 40, the HDC 60, and any other component, for example.

The HDC 60 controls read/write processing and controls data transfer between the host 100 and the R/W channel 40 according to an instruction from the MPU 50. The HDC 60 is electrically connected to, for example, the R/W channel 40, the MPU 50, the volatile memory 70, the nonvolatile memory 80, the buffer memory 90, and any other component.

The HDC 60 includes a head control unit 610, a servo control unit 620, and a command control unit 630. The HDC 60 executes processing of these units the head control unit 610, the servo control unit 620, the command control unit 630, and any other component, for example, on firmware. It should be noted that the HDC 60 may include these units as a circuit. A part of the configuration of the HDC 60 (for example, the head control unit 610, the servo control unit 620, and the command control unit 630) may be provided in the MPU 50.

The head control unit 610 controls the head HD in response to a request (command) from the host 100 or any other component. The head control unit 610 selects a particular head HD from the plurality of heads HD in response to a command from the host 100 or any other component. The head control unit 610 moves the particular head HD to a particular position on the disk DK in response to a command from the host 100 or any other component. In response to a command from the host 100 or any other component, the head control unit 610 switches from a particular head HD to another head HD in the plurality of heads HD. In the following, "switching from a particular head HD to another head HD in the plurality of heads HD" is sometimes referred to as "head change". In the following, the "head before head change" is sometimes referred to as a "head before head change", and the "head HD after head change" is sometimes referred to as a "head after head change".

The servo control unit 620 controls the position of the head HD. In other words, the servo control unit 620 controls access using the head HD to a particular region of the disk DK. The servo control unit 620 has a tracking control unit 6210, a seek control unit 6220, and an eccentricity table update unit 6230.

The tracking control unit 6210 controls tracking of the head HD to a particular track (cylinder) of the disk DK. The term "tracking" includes "following a particular path, e.g. a particular track when writing data to the disk DK" or "following a particular path, e.g. a particular track when data is read from the disk DK".

The seek control unit 6220 controls a seek of the head HD from a particular track (cylinder) to a target track (in the following, sometimes referred to as a target track) on the disk DK. The seek control unit 6220 has a direct current (DC) component head-to-head relative position calculation unit 6221, an alternating current (AC) component head-to-head relative position calculation unit 6222, a head-to-head relative position correction unit 6223, and a head change time servo zone correction unit 6224. In the following, the "relative position between different heads in the plurality of heads HD corresponding to the plurality of disks DK" is sometimes referred to as "a relative position between heads".

The DC component head-to-head relative position calculation unit 6221 calculates a DC component head-to-head relative position in a particular track (cylinder) of the disk DK. For example, the DC component head-to-head relative position calculation unit 6221 calculates a difference value (in the following, sometimes referred to as a DC offset difference value) between a plurality of correction values (offset values) corresponding to a shift amount or an offset amount (in the following, sometimes referred to as a DC component displacement amount or a DC component offset amount) in the radial direction of the two heads HD before and after the head change that does not vary (constant) within one circle of a particular track (cylinder) of the disk DK. The DC component displacement amount or the DC component offset amount is caused due to the displacement of attachment of the suspension of the magnetic disk device 1 or a servo write pitch, for example. The DC component head-to-head relative position calculation unit 6221 calculates a DC component head-to-head relative position (or a DC component head-to-head relative position correction value) based on a DC component head-to-head offset difference value, for example.

The AC component head-to-head relative position calculation unit 6222 calculates an AC component head-to-head relative position. For example, the AC component head-to-head relative position calculation unit 6222 calculates, as the AC component head-to-head relative position (or the AC component head-to-head relative position correction value), the relative eccentric position between the two disks DK corresponding to the two heads HD before and after the head change in the sector of the particular track (cylinder) of the disk DK of the two heads HD before and after the head change varying within one circle of the particular track (cylinder) of the disk DK.

The head-to-head relative position correction unit 6223 corrects a head-to-head relative position between a plurality of heads HD in the plurality of heads HD when a head change occurs. The head-to-head relative position correction unit 6223 calculates the head-to-head relative position (or the head-to-head relative position correction value) of the two heads HD before and after the head change based on the DC component head-to-head relative position and the AC component head-to-head relative position. In the case in which a head change is performed, the head-to-head relative position correction unit 6223 can correct a position at which the head HD before the head change is arranged on a particular track, e.g. a radial position (in the following, sometimes referred to as a current estimated position or a previous estimated position) to a position at which the head HD after the head change is estimated to be arranged on a particular track, for example, a radial position (in the following, sometimes referred to as a next estimated position or a later estimated position), based on the head-to-head relative positions of the two heads HD before and after the head change.

The head change time servo zone correction unit 6224 corrects the servo zone at head change. The head change time servo zone correction unit 6224 corrects the servo zone at the time of head change based on the relative position between the heads, for example.

The eccentricity table update unit 6230 updates the eccentricity table. For example, in the case in which the RRO is learned after the subsequent disk shift, the eccentricity table update unit 6230 records at least one of the eccentricity table 710 of the volatile memory 70 and the eccentricity table 810 of the nonvolatile memory 80, or updates at least one of the eccentricity table 710 of the volatile memory 70 and the eccentricity table 810 of the nonvolatile memory 80.

The command control unit 630 controls a command received from the host 100 or any other component. For example, the command control unit 630 stores commands received from the host 100 or any other component in a queue in the order of reception from the host 100 or any other component, and accesses a position or an area specified by the command, e.g. a sector through the servo control unit 620 based on a particular command among at least one command stored in the queue. In the following, "accessing a position or a region specified by a particular command based on the command" is sometimes referred to as "processing the command". "The command stored in the queue" is sometimes referred to as "a queue command". The term "processing a queue command" is sometimes referred to as "queuing".

In processing a particular queue command (in the following, the command sometimes referred to as a current command), the command control unit 630 executes arithmetic processing based on the position of the disk DK on which the head HD is currently disposed, for example, the position (in the following, it is sometimes simply referred to as a current position) of the data sector of the disk DK on which the head HD is currently disposed and a plurality of queue commands stored in the queue in order of reception from the host 100 or any other component, selects a particular command from the plurality of queue commands based on the result of the arithmetic processing, replaces the order of the selected command with the order of the command to be processed subsequent to the current command (in the following, the order sometimes referred to as the following order), and processes the selected command after processing the current command. In the following, "switching the order of processing a plurality of commands", "changing the logical-physical map", and any other process sometimes referred to as "reordering". The "process of executing a particular operation (calculation) process, selecting a particular command from a plurality of commands based on a result of the particular operation (calculation) process, and reordering the order of the commands selected from the plurality of commands" is sometimes referred to as "reordering operation process", "reordering operation", or "reordering process". In addition, "a command to be processed subsequent to the current command" is sometimes referred to as a "subsequent processing command".

FIG. 9 is a block diagram illustrating an example of a servo control system SY according to the present embodiment.

The magnetic disk device 1 includes the system (in the following, sometimes referred to as a servo control system) SY for performing servo control of the head HD. The servo control system SY includes an RRO current compensation unit S1, a current indication value determination unit S2, a state estimation unit S3, a current application unit S4, a plant S5, a calculator CL1, a calculator CL2, and a calculator CL3. The RRO current compensation unit S1, the current indication value determination unit S2, the state estimation unit S3, the current application unit S4, the plant S5, the calculator CL1, the calculator CL2, and the calculator CL3 are included in the actuator ACT, the driver IC 20, the head amplifier IC 30, the system controller 130, the disk DK, the volatile memory 70, the nonvolatile memory 80, and the buffer memory 90, for example. The plant S5 is formed of an actuator ACT, the driver IC 20, the head amplifier IC 30, the system controller 130, and any other component, for example.

The RRO current compensation unit S1 suppresses eccentricity. The RRO current compensation unit S1 performs learning in orders using a position error signal (PES) acquired during tracking so as to obtain a current output in which a repeatable position error (RPE) becomes small, and calculates a current value (in the following, sometimes referred to as an RRO current compensation value) Ivcm_rro for performing compensation so as to suppress eccentricity, e.g. RRO, based on the learning result.

The current indication value determination unit S2 determines a current indication value Itgt. The state estimating unit S3 calculates an estimated position pesti of the head HD in the subsequent sample, e.g. the subsequent head HD and an estimated velocity vesti of the head HD, e.g. the subsequent head HD. One sample can correspond to a time corresponding to an interval of a plurality of consecutive servo wedges SvWd, for example.

The current application unit S4 applies a current (in the following, sometimes referred to as a VCM current) Ivcm for driving the VCM 14 according to the current indication value Itgt. The plant S5 drives the actuator ACT according to the VCM current Ivcm applied to the VCM 14 to move the head HD to a particular position, and reads the servo pattern using the head HD to demodulate an actual position (in the following, sometimes referred to as an actual position or a demodulation position) p of the head HD.

To the calculator CL1, a target velocity vtgt of the head HD and the estimated velocity vesti of the head HD are inputted. The calculator CL1 outputs a difference value (in the following, sometimes referred to as a head velocity difference value) obtained by subtracting the estimated velocity vesti of the head HD from the target velocity vtgt of the head HD to the current indication value determination unit S2.

To the calculator CL2, a target position ptgt of the head HD and the estimated position pesti of the head HD are inputted. The calculator CL2 outputs a difference value (in the following, sometimes referred to as a head position difference value) obtained by subtracting the estimated position pesti of the head HD from the target position ptgt of the head HD to the RRO current compensation unit S1 and the current indication value determination unit S2. Here, in the case in which virtual circle control, described later, is executed, the target position ptgt is corrected using information at the time of adjustment for the virtual circle control mainly in the servo state of the position control.

To the RRO current compensation unit S1, the head position difference value is inputted. The RRO current compensation unit S1 calculates the RRO compensation current value Ivcm_rro based on the head position difference value, and outputs the RRO compensation current value Ivcm_rro to the current indication value determination unit S2. Here, the RRO compensation current value corresponds to a value of a current that ensures the RRO.

To the current indication value determination unit S2, a target acceleration atgt, the head velocity difference value, the head position difference value, and the RRO compensation current value Ivcm_rro are inputted. The current indication value determination unit S2 calculates the current indication value Itgt based on the target acceleration atgt, the head velocity difference value, the head position difference value, and the RRO compensation current value Ivcm_rro, and outputs the current indication value Itgt to the state estimation unit S3 and the current application unit S4.

To the state estimation unit S3, a head-to-head relative position pchg_hd, the current indication value Itgt, and an estimated position error perr are inputted. The state estimating unit S3 calculates the estimated velocity vesti of the head HD and the estimated position pesti of the head HD in the subsequent sample based on the head-to-head relative position pchg_hd, the current indication value Itgt, and the estimated position error perr, outputs the estimated velocity vesti of the head HD to the calculator CL1, and outputs the estimated position pesti of the head HD to the calculators CL2 and CL3.

To the current application unit S4, the current indication value Itgt is inputted. The current application unit S4 outputs the VCM current value Ivcm to the plant S5 according to the current indication value Itgt.

The plant S5 drives the actuator ACT according to the VCM current value Ivcm to move the head HD to the actual position p, and outputs the actual position p to the calculator CL3.

To the calculator CL3, the actual position p and the estimated position pesti are inputted. The calculator CL3 outputs a specified position error perr obtained by subtracting the estimated position pesti from the actual position p to the state estimating unit S3.

FIG. 10 is a plan view illustrating an example of virtual circle control. The disk DK in FIG. 10 illustrates a servo track SvTR10$k$−1, a servo track SvTR10$k$−2, a servo track SvTR10$k$, a servo track SvTR10$k$+1, a servo track SvTR10$k$+2, and a virtual servo track VSTR 10. In FIG. 10, the disk center DKC is displaced (shifted) from the rotation center SPC. In FIG. 10, in the case in which the disk center DKC is displaced from the rotation center SPC, the servo track SvTR10$n$ can be matched with the virtual servo track VSTR 10. In FIG. 10, the servo tracks TR10$k$−1 to TR10$k$+2 are disposed concentrically with the disk center DKC. The virtual servo track VSTR 10 is disposed concentrically with the rotation center SPC.

Figure 11:
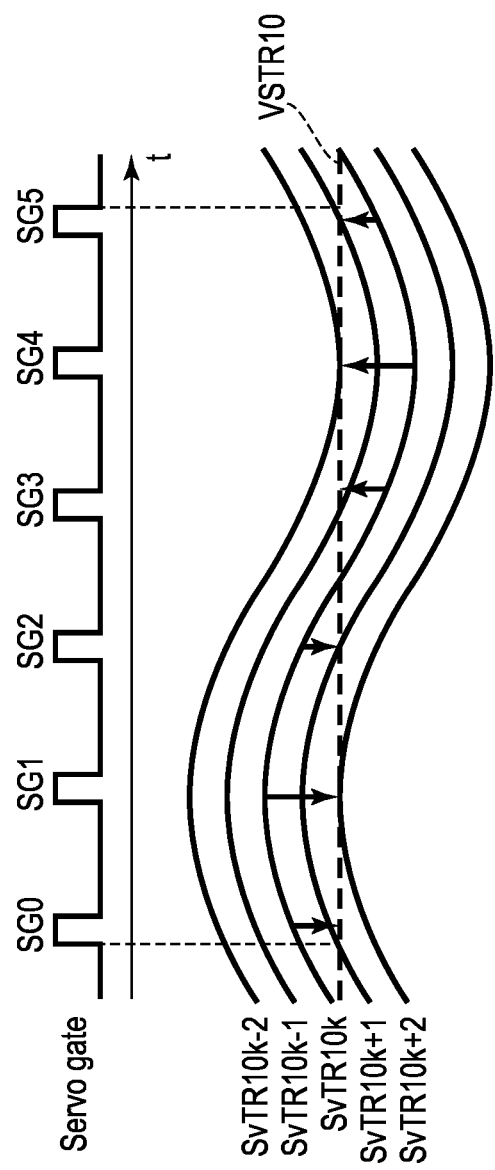
FIG. 11 is a schematic diagram illustrating an example of virtual circle control.

The magnetic disk device 1 executes servo control (in the following, sometimes referred to as virtual circle control) for tracking the virtual servo track. In the case in which the magnetic disk device 1 tracks the servo track of the disk DK eccentric to the rotation center SPC, the head HD fluctuates within one circle in the circumferential direction. For example, in the case in which a disk shift occurs, the magnetic disk device 1 fluctuates in the radial direction of one cycle of the head HD within one circle in the circumferential direction of the servo track of the disk DK eccentric to the rotation center SPC. In the case in which the magnetic disk device 1 tracks the virtual servo track, the head HD hardly fluctuates by one rotation in the circumferential direction. In the example illustrated in FIG. 10, in the case in which the virtual servo track VSTR 10 is tracked by the virtual circle control, the magnetic disk device 1 learns, measures, or calibrates information (in the following, sometimes referred to as virtual circle eccentricity information) of eccentricity regarding the virtual circle such as a displacement amount or an offset amount (in the following, sometimes referred to as a virtual circle displacement amount or a virtual circle offset amount) in the radial direction that varies at each circumferential position in one circle. FIG. 11 is a schematic diagram illustrating an example of virtual circle control. FIG. 11 corresponds to FIG. 10. FIG. 11 illustrates a servo gate corresponding to the read (in the following, sometimes referred to as a servo lead) of the servo wedge SvWd of a particular track of the disk DK, a path for tracking the servo tracks SvTR10$k$−2 to 10$k$+2, and a path for tracking the virtual servo track VSTR. The servo gate is asserted when rising, and is negated when falling. In FIG. 11, the servo gate rises and falls at SG0, rises and falls at SG1, rises and falls at SG2, rises and falls at SG3, rises and falls at SG4, and rises and falls at SG5.

The magnetic disk device 1 corrects a target servo track (in the following, sometimes referred to as a target servo track) to a virtual servo track based on virtual circle eccentricity information by virtual circle control, and performs servo read of the virtual servo track. In the example illustrated in FIG. 11, the magnetic disk device 1 adds each virtual circle offset amount corresponding to the circumferential positions to the circumferential positions of the servo track SvTR10$k$ by virtual circle control to correct the virtual circle offset amount to the virtual servo track VSTR 10, and servo-reads the virtual servo track VSTR 10.

Figure 12:
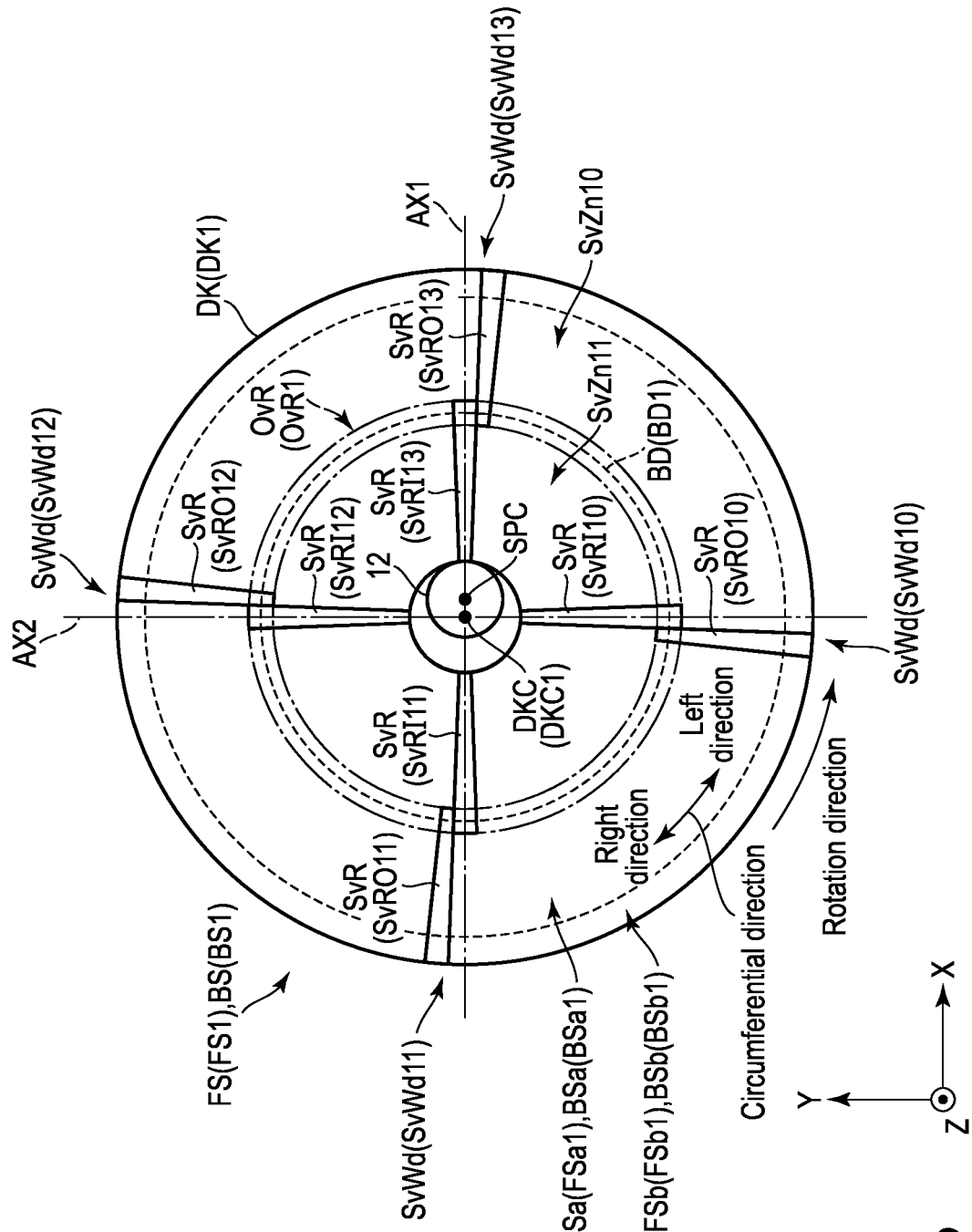
FIG. 12 is a plan view illustrating an example of eccentricity of the disk to a spindle according to an embodiment.

FIG. 12 is a plan view illustrating an example of eccentricity of the disk DK1 to the spindle 12 according to the present embodiment.

The disk center DKC1 of the disk DK1 is displaced (shifted) to the rotation center SPC. In the example illustrated in FIG. 12, the disk center DKC1 illustrated in FIG. 4 is displaced (shifted) to the side opposite to the tip end side of the arrow in the first direction X to the rotation center SPC.

Figure 13:
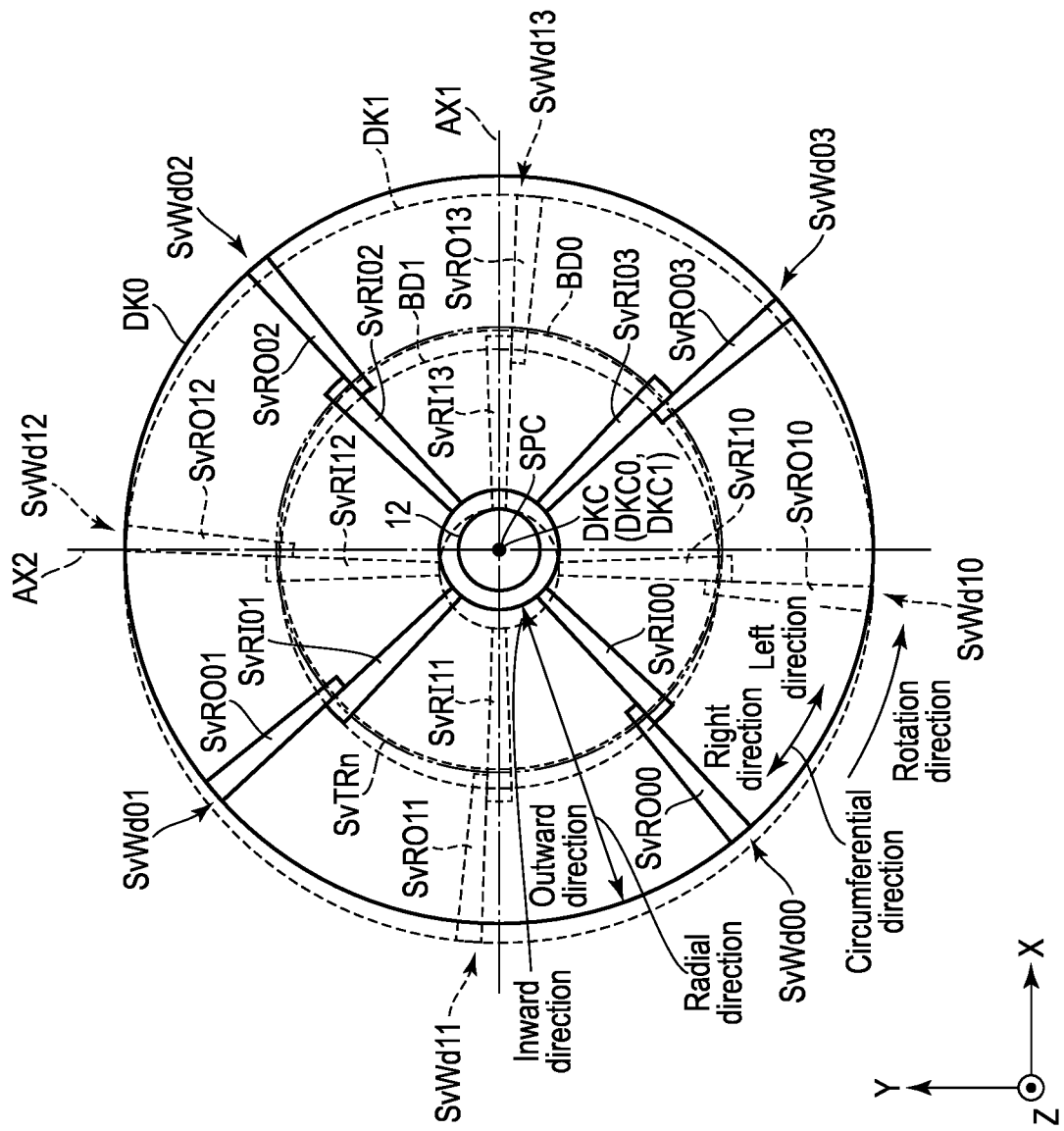
FIG. 13 is a schematic diagram illustrating an example of head change of a plurality of different heads corresponding to a plurality of different disks.

FIG. 13 is a schematic diagram illustrating an example of a head change of a plurality of different heads HD corresponding to a plurality of different disks DK. In FIG. 13, the disk DK0 illustrated in FIG. 3 and the disk DK1 illustrated in FIG. 12 overlap with each other. In FIG. 13, the disk DK0 and the disk DK1 have the same rotation center SPC. FIG. 13 illustrates the servo track SvTRn arranged slightly outward from the boundary BD0.

In the example illustrated in FIG. 13, the magnetic disk device 1 tracks the servo track SvTRn using the head HD0 in the disk DK0. For example, the magnetic disk device 1 reads the servo regions SvRI00 and SvRO00 using the head HD0 in the disk DK0. After the servo regions SvRI00 and SvRO00 are read using the head HD0 in the disk DK0, the magnetic disk device 1 changes the head from the head HD0 to the head HD1, and can cause the head HD1 to travel by inertia on a path corresponding to the servo track SvTRn in the disk DK1.

Figure 14:
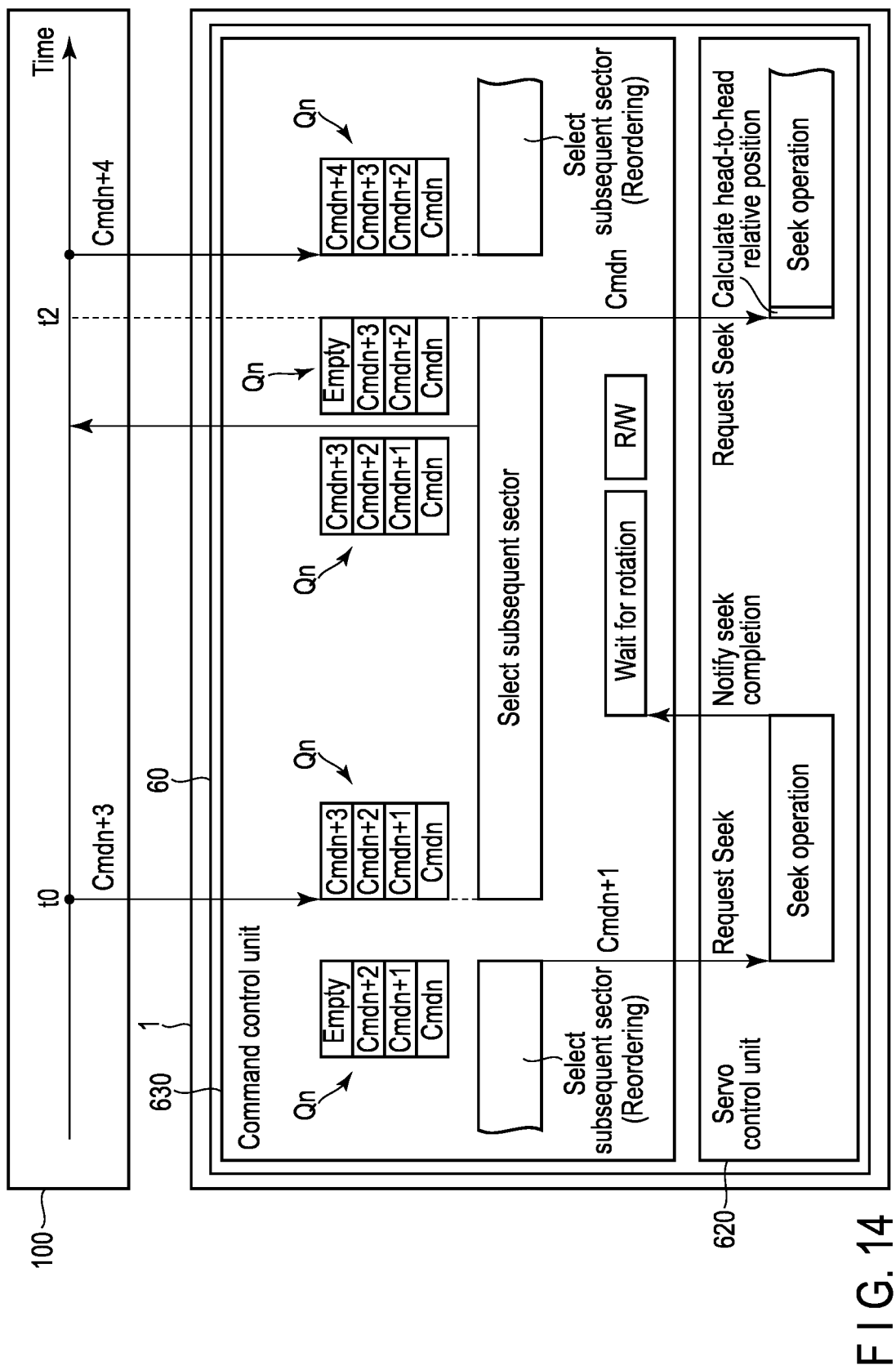
FIG. 14 is a schematic diagram illustrating an example of timing for calculating a relative position between heads at the time of head change.

FIG. 14 is a schematic diagram illustrating an example of timing for calculating the relative position between the heads at the time of head change. FIG. 14 illustrates the host 100 and the magnetic disk device 1. In FIG. 14, the magnetic disk device 1 includes the HDC 60. In FIG. 14, the HDC 60 includes a servo control unit 620 and a command control unit 630. In FIG. 14, the command control unit 630 has a queue Qn. In FIG. 14, the horizontal axis expresses time. In FIG. 14, time passes toward the tip end of the arrow of the horizontal axis of time. FIG. 14 illustrates times t0 and t2. The time t2 corresponds to a time later (after) the time t0. A queue command Cmdn corresponds to a queue command transferred from the host 100 to the command control unit 630 earlier than (before) the queue command Cmdn+1 and stored in the queue Qn. The queue command Cmdn+1 corresponds to a queue command transferred from the host 100 to the command control unit 630 earlier than (before) the queue command Cmdn+2 and stored in the queue Qn. The queue command Cmdn+2 corresponds to a queue command transferred from the host 100 to the command control unit 630 earlier than (before) the command Cmdn+3 and stored in the queue Qn. The queue command Cmdn+3 corresponds to a queue command transferred from the host 100 to the command control unit 630 earlier than (before) the queue command Cmdn+4 and stored in the queue Qn. In FIG. 14, the number of commands that can be stored in the queue Qn (in the following, sometimes referred to as a queue depth (QD)) is four.

In the example illustrated in FIG. 14, the magnetic disk device 1 executes reordering operation processing on the queue commands Cmdn, Cmdn+1, and Cmdn+2, and processes the selected queue command Cmdn+1. The magnetic disk device 1 starts control of the seek operation of the current head HD based on the queue command Cmdn+1, and starts the seek operation of the current head HD from the sector (in the following, sometimes referred to as a current sector) of the track (in the following, sometimes referred to as a current track) in which the current head HD is arranged to a particular sector (in the following, sometimes referred to as a next sector) of the track (in the following, sometimes referred to as a next track) to be a target subsequent to the current track specified by the queue command Cmdn+1. The magnetic disk device 1 waits for rotation to position the current head HD in the subsequent sector when seeking the current head HD from the current track to the subsequent track specified by the queue command Cmdn+1, and writes data specified by the queue command Cmdn+1 to the subsequent sector when positioning the current head HD in the subsequent sector, or reads data written on the sector specified by the queue command Cmdn+1.

The magnetic disk device 1 receives the queue command Cmdn+3 transferred from the host 100 at time t0 at which the queue command Cmdn+1 is processed. Since the QD of the queue Qn is four and the number of queue commands is three, the magnetic disk device 1 stores the queue command Cmdn+3 received from the host 100 in the queue Qn. In processing the queue command Cmdn+1, the magnetic disk device 1 performs reordering operation processing on the queue commands Cmdn, Cmdn+2, and Cmdn+3, and selects the queue command Cmdn. The magnetic disk device 1 returns a response to the host 100 when the processing of the queue command Cmdn+1 is completed.

The magnetic disk device 1 starts the processing of the queue command Cmdn at time t2 after the processing of the queue command Cmdn+1 is completed. In the case in which the processing of the queue command Cmdn is started, the magnetic disk device 1 determines whether the number (in the following, sometimes referred to as a head number) of the (physical) head (in the following, sometimes referred to as the following head) HD specified by the command subsequent to the current head HD corresponding to the queue command Cmdn, for example, the head number of the head HD1 is the same as or different from the head number of the current (physical) head HD, for example, the head number of the head HD0. In other words, in the case in which the processing of the queue command Cmdn is started, the magnetic disk device 1 determines whether the subsequent head HD corresponding to the queue command Cmdn is the same as or different from the current head HD0.

In the case in which it is determined that the head number of the subsequent head HD corresponding to the queue command Cmdn is the head number of the head HD0 that is the same as the head number of the current head HD0, the magnetic disk device 1 starts the seek operation of the current head HD0 on the subsequent track specified by the queue command Cmdn. When the current head HD0 is sought to the subsequent track, the magnetic disk device 1 waits for rotation in order to position the current head HD0 in the subsequent sector of the subsequent track. The magnetic disk device 1 writes data specified by the queue command Cmdn to the subsequent sector when the current head HD0 is positioned in the sector. In other words, in the case in which it is determined that the subsequent head HD corresponding to the queue command Cmdn is the same as the current head HD0, the magnetic disk device 1 waits for rotation to position the current head HD0 in the subsequent sector when the current head HD0 is sought to the subsequent sector of the subsequent track specified by the queue command Cmdn, and writes the data specified by the queue command Cmdn to the subsequent sector when the current head HD0 is positioned in the subsequent sector.

In the case in which it is determined that the head number of the subsequent head HD corresponding to the queue command Cmdn is the head number of the head HD1 different from the current head number of the head HD0, the magnetic disk device 1 calculates the head-to-head relative position correction value of the head-to-head relative positions of the head HD0 and the head HD1, and starts the seek operation of the subsequent head HD1 to the subsequent track specified by the queue command Cmdn based on the queue command Cmdn and the head-to-head relative position correction value. In other words, in the case in which it is determined that the subsequent head HD corresponding to the queue command Cmdn is different from the current head HD0, the magnetic disk device 1 calculates the head-to-head relative position correction value of the head-to-head relative positions of the head HD0 and the head HD1, and starts the seek operation of the subsequent head HD1 to the subsequent track specified by the queue command Cmdn based on the queue command Cmdn and the head-to-head relative position correction value.

The magnetic disk device 1 receives the queue command Cmdn+4 transferred from the host 100 when the queue command Cmdn is processed. Since the QD of the queue Qn is four and the number of queue commands is three, the magnetic disk device 1 stores the queue command Cmdn+4 received from the host 100 in the queue Qn.

FIG. 15 is a schematic diagram illustrating an example of a servo gate in the case in which timing is not corrected. FIG. 15 corresponds to FIGS. 13 and 14. FIG. 15 illustrates a servo pattern and a servo gate. The servo pattern in FIG. 15 corresponds to the servo track SvTRn in FIG. 13. In FIG. 15, the servo pattern includes the servo region SvRI00, the servo region SvRO00, and the servo region SvRI11. In FIG. 15, the servo gate is asserted when rising, and is negated when falling. In FIG. 15, the horizontal axis of the servo gate expresses time t. The horizontal axis in FIG. 15 indicates timings T151, T152, T153, and T154. For example, the timings T151 to T154 correspond to a timing after a particular time from the reference timing. It should be noted that the timings T151 to T154 may correspond to an absolute time. The timing T152 corresponds to the time after the timing T151, the timing T153 corresponds to the time after the timing T152, and the timing T154 corresponds to the time after the timing T153. Timing T151 corresponds to a timing at which the servo gate is asserted, timing T152 corresponds to a timing at which the servo gate is negated, timing T153 corresponds to a timing at which the servo gate is asserted, and timing T154 corresponds to a timing at which the servo gate is negated. The timings T151 and T152 correspond to the servo region SvRO00. FIG. 15 illustrates an interval T11 between the timing T152 and the timing T153. The interval T11 corresponds to a time interval of the servo gates.

In the example illustrated in FIG. 15, as illustrated in FIG. 13, the magnetic disk device 1 tracks the servo track SvTRn using the head HD0 in the disk DK0, asserts the servo gate at a timing T151, and negates the servo gate at a timing T152 to read the servo region SvRO00. In the case in which the head is changed from the head HD0 to the head HD1 after reading the servo region SvRO00, the magnetic disk device 1 does not correct (or adjust) the timing of the servo gate. In the case in which the timing of the servo gate is not corrected (or adjusted), the magnetic disk device 1 asserts the servo gate at the timing T153, which is after the timing T152 by the interval T11. In the case in which the timing of the servo gate is not corrected when the head is changed from the head HD0 to the head HD1, there is a possibility that the magnetic disk device 1 fails to read the servo region.

FIG. 16 is a schematic diagram illustrating an example of a servo gate in the case in which timing is corrected at the time of head change. FIG. 16 corresponds to FIGS. 13 and 14. FIG. 16 illustrates a servo pattern and a servo gate. The servo pattern in FIG. 16 corresponds to the servo track SvTRn in FIG. 13. In FIG. 16, the servo pattern includes the servo region SvRI00, the servo region SvRO00, and the servo region SvRI11. In FIG. 16, the servo gate is asserted when rising, and is negated when falling. In FIG. 16, the horizontal axis of the servo gate expresses time t. The horizontal axis in FIG. 16 indicates the timings T151, T152, T153, and a timing T161. For example, the timing T161 corresponds to a timing after a particular time from the reference timing. It should be noted that the timing T161 may correspond to an absolute time. The timing T161 corresponds to the time after the timing T152, and the timing T153 corresponds to the time after the timing T161. The timing T161 corresponds to a timing at which the servo gate is asserted, and the timing T153 corresponds to a timing at which the servo gate is negated. The timings T161 and T153 correspond to the servo region SvRI11. FIG. 16 illustrates an interval T12 between the timing T161 and the timing T153. The interval T12 corresponds to a time interval of the servo gates. The interval T12 is smaller than the interval T11, for example. In the case in which the servo region SvRI11 is more distant in the circumferential direction than illustrated in FIG. 16, the interval T12 may be equal to or more than the interval T11.

In the example illustrated in FIG. 16, as illustrated in FIG. 13, the magnetic disk device 1 tracks the servo track SvTRn using the head HD0 in the disk DK0, asserts the servo gate at a timing T151, and negates the servo gate at a timing T152 to read the servo region SvRO00. In the case in which the head is changed from the head HD0 to the head HD1 after reading the servo region SvRO00, the magnetic disk device 1 corrects (or adjusts) the timing of the servo gate. In the case in which the timing of the servo gate is corrected (or adjusted), the magnetic disk device 1 asserts the servo gate at the timing T161 after the interval T12 from the timing T152. In the case in which the timing of the servo gate is corrected in changing the head from the head HD0 to the head HD1, the magnetic disk device 1 asserts the servo gate at the timing T161 and negates the servo gate at the timing T153 to read the servo region SvRI11.

In the following, a head change processing method will be described with reference to FIGS. 17, 18, 19, 20, and other drawings.

In the case in which (the head number of) the sector and the head (next head) HD specified by the command received from the host 100 or any other component at the time of head change are determined, the magnetic disk device 1 corrects the estimated position pesti used in the subsequent sample. For example, the magnetic disk device 1 calculates a DC component head-to-head relative position pchg_hd_dc by subtracting the constant offset amount of the current head HD from the constant offset amount of the subsequent head HD at the time of head change.

The magnetic disk device 1 calculates an AC component head-to-head relative position pchg_hd_ac. For example, in the case in which the AC component head-to-head relative position pchg_hd_ac is calculated, the magnetic disk device 1 estimates the RRO position Prro by the servo control transmission characteristic based on the RRO compensation current value Ivcm_rro by the following equation (all orders, Laplace transform formula).

$$Prro = PL \times Ivcm\_rro \qquad \text{Equation (1)}$$

Here, PL corresponds to a plant.

In the case in which large eccentricity occurs due to a disk shift, e.g. a subsequent disk shift, when the RRO correction is executed and the particular servo track is completely followed using the head HD, the magnetic disk device 1 estimates the primary RRO position by multiplying the primary component of the RRO compensation current value based on the read signal obtained by reading the particular servo track of the disk DK for one cycle by a current position conversion coefficient coeff1 (Laplace transform formula only for the first order). Here, the current position conversion coefficient corresponds to a coefficient to be converted from the dimension of the current to the dimension of the position.

$$Prro1 = coeff1 \times Ivcm\_rro1 \qquad \text{Equation (2)}$$

Here, Ivcm_rro1 is a first-order RRO compensation current value.

In the case in which the current position conversion coefficient coeff1 is different depending on the environment, the temperature of the VCM 14, or the radial position of the head HD, the magnetic disk device 1 learns the current position conversion coefficient coeff1 for each segmented radial section, and interpolates the current position conversion coefficient coeff1 by linear approximation or polynomial approximation as necessary using a learning value (for example, the current position conversion coefficient) corresponding to each section.

The magnetic disk device 1 includes TABLE (in the following, sometimes referred to as COS TABLE) of a COS component of a coefficient of the number (in the following, sometimes referred to as the number of indexes) of indexes corresponding to the number (in the following, sometimes referred to as the number of servo wedges) of servo wedges SvWd or the number (in the following, the number of servo sectors sometimes referred to as the number of servo sectors) of servo sectors in a particular track of the disk DK and TABLE (in the following, sometimes referred to as SIN TABLE) of a SIN component of the coefficient. The magnetic disk device 1 has a primary parameter for suppressing eccentricity corresponding to each head HD. It should be noted that the magnetic disk device 1 may have parameters of the orders for suppressing eccentricity corresponding to the heads HD.

Figures 17, 18:
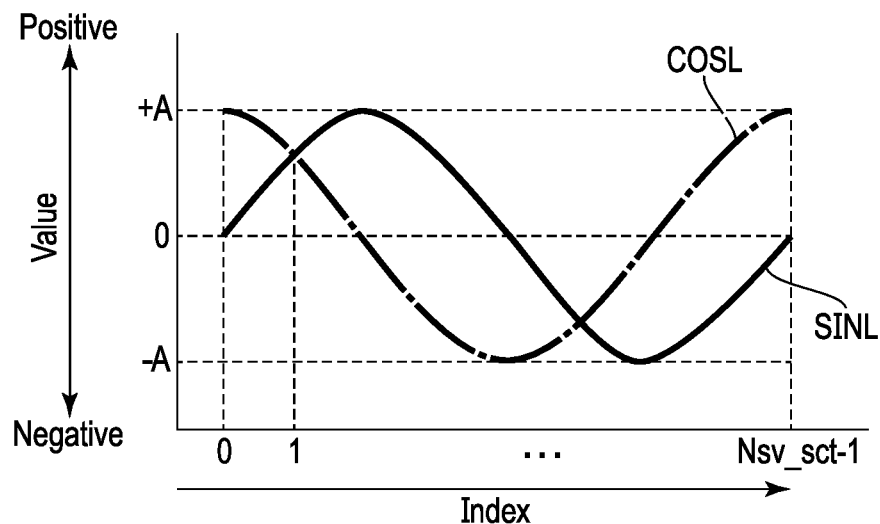
FIG. 17 is a schematic diagram illustrating an example of a servo gate in the case in which timing is corrected at the time of head change.
FIG. 18 is a schematic diagram illustrating an example of a table including COS TABLE and SIN TABLE.

FIG. 17 is a schematic diagram illustrating an example of changes COS components and SIN components COS L and SIN L of coefficients corresponding to indexes in a particular track of the disk DK. In FIG. 17, the horizontal axis expresses the index corresponding to the servo wedge SvWd or the servo sector of the particular track, and the vertical axis expresses the value corresponding to the amplitude. In the vertical axis in FIG. 17, the positive value increases as going toward the tip end side of the positive arrow, and the negative value decreases as going toward the tip end side of the negative arrow. In other words, the absolute value of the value increases as the value goes toward the tip end side of the positive arrow and the negative arrow. The vertical axis in FIG. 17 expresses values A and −A. The absolute values of A and −A are the same. In the horizontal axis in FIG. 17, the index increases toward the tip end side of the arrow and decreases toward the side opposite to the tip end side of the arrow. The horizontal axis in FIG. 17 indicates indexes 0, 1, . . . , and Nsv_sct−1. Nsv_sct−1 corresponds to the number of servo wedges (or the number of servo sectors)−1 of a particular track.

The magnetic disk device 1 acquires a change COS L of the COS component of the coefficient and a change SIN L of the SIN component as illustrated in FIG. 17.

FIG. 18 is a schematic diagram illustrating an example of a table TB 181 including COS TABLE and SIN TABLE. The table TB 181 includes COS TABLE and SIN TABLE. In the table TB 181 in FIG. 18, COS TABLE includes a COS component of a coefficient corresponding to each index of a particular track of the disk DK. For example, COS TABLE corresponds to the change COS L of the COS component of the coefficient illustrated in FIG. 17. The SIN TABLE includes a SIN component of a coefficient corresponding to each index of a particular track of the disk DK. For example, SIN TABLE corresponds to the change SIN L of the SIN component of the coefficient illustrated in FIG. 17.

The magnetic disk device 1 records the table TB 181 in a particular recording area the volatile memory 70, the nonvolatile memory 80, the buffer memory 90, and any other component, for example. For example, the magnetic disk device 1 records the table TB 181 in at least one of the volatile memory 70, the nonvolatile memory 80, and the buffer memory 90. It should be noted that the table TB 181 may be included in the eccentric table.

In the case in which the head is changed from the current head HD, e.g. the head HDa to the subsequent head HD, e.g.

the head HDb, the magnetic disk device 1 calculates the eccentric position (formula of time-axis discrete notation only in the first order) from the following equation.

$$Prro1[sct]=coeff1\times(R1c\times COS\ TABLE[sct]+R1s\times SIN\ TABLE[sct])\quad\text{Equation (3)}$$

Here, R1c is a primary COS component of the eccentricity compensation current value corresponding to the particular head HD, and R1s is a primary SIN component of the eccentricity compensation current value corresponding to the particular head HD.

In the case in which a particular track of a particular disk DK is tracked using a particular head HD, the magnetic disk device 1 learns a parameter related to an eccentricity compensation current value corresponding to the particular head HD in real time.

FIG. 19 is a schematic diagram illustrating an example of a table TB 191 of eccentricity compensation current values corresponding to a particular head HD. In FIG. 19, a table TB 191 includes an eccentricity compensation current value (for example, the first-order COS component of the eccentricity compensation current value and the first-order SIN component of the eccentricity compensation current value) corresponding to a particular head HD.

The magnetic disk device 1 records the table TB 191 in a particular recording area, e.g. the volatile memory 70, the nonvolatile memory 80, the buffer memory 90, and any other component. For example, the magnetic disk device 1 records the table TB 191 in at least one of the volatile memory 70, the nonvolatile memory 80, and the buffer memory 90. It should be noted that the table TB 191 may be included in the eccentric table.

In the case in which the head is changed from the head HDa to the head HDb, the magnetic disk device 1 calculates the relative eccentric positions (formula of time-axis discrete notation only in the first order) of the head HDa and the head HDb from the following equation.

$$dprro1[sct]=coeff1\times(dR1c\_ab\times COS\ TABLE[sct]+dR1s\_ab\times SIN\ TABLE[sct])\quad\text{Equation (4)}$$

Here, $dR1c\_ab$ is a first-order COS component of the DFT coefficient corresponding to the head-to-head relative positions of the two heads HDa and HDb before and after the head change, and $dR1s\_ab$ is a first-order SIN component of the DFT coefficient corresponding to the head-to-head relative positions of the two heads HDa and HDb before and after the head change. The DFT coefficients $dR1c\_ab$ and $dR1s\_ab$ are derived by the following formula.

$$dR1c\_ab\ \text{is}\ R1c\_b-R1c\_a\quad\text{Formula (5)}$$

$$dR1s\_ab\ \text{is expressed by}\ R1s\_b-R1s\_a\quad\text{Formula (6)}.$$

Here, $R1c\_b$ is a primary COS component of the eccentricity compensation current value corresponding to the head HDb, $R1c\_a$ is a primary COS component of the eccentricity compensation current value corresponding to the head HDa, $R1s\_b$ is a primary SIN component of the eccentricity compensation current value corresponding to the head HDb, and $R1s\_a$ is a primary SIN component of the eccentricity compensation current value corresponding to the head HDa.

The magnetic disk device 1 may have a table including a plurality of DFT coefficients corresponding to a plurality of head-to-head relative positions corresponding to a plurality of combinations of two heads in the plurality of heads HD by calculating in advance a plurality of head-to-head relative positions (amplitude/phase, COS coefficient/SIN coefficient) corresponding to a plurality of combinations of two heads in the plurality of heads HD. The magnetic disk device 1 may update a table including a plurality of DFT coefficients corresponding to a plurality of head-to-head relative positions corresponding to a plurality of combinations of two heads in the plurality of heads HD each time the table of the eccentricity compensation current value is updated, or may update the table of the eccentricity compensation current value by background processing when the value of the table of the eccentricity compensation current value exceeds a particular threshold. Since the magnetic disk device 1 has the table including the plurality of DFT coefficients corresponding to the plurality of head-to-head relative positions corresponding to the plurality of combinations of two heads in the plurality of heads HD, the magnetic disk device 1 can refer to the DFT coefficients without calculating the DFT coefficients, and the calculation time can be reduced.

FIG. 20 is a schematic diagram illustrating an example of a table TB201 of DFT coefficients corresponding to the head-to-head relative positions of the two heads HD before and after the head change. In FIG. 20, the table TB201 includes a first-order COS component dR1c and a first-order SIN component dR1s of the DFT coefficient corresponding to the head-to-head relative positions of the two current heads HD (From) and the subsequent head HD (To) before and after the head change. The current head HD (From) and the subsequent heads HD (To) include heads HD0, HD1, . . . , and HDn.

The magnetic disk device 1 records the table TB201 in a particular recording area, e.g. the volatile memory 70, the nonvolatile memory 80, the buffer memory 90, and any other component. For example, the magnetic disk device 1 records the table TB201 in at least one of the volatile memory 70, the nonvolatile memory 80, and the buffer memory 90. The table TB201 may be included in the eccentric table.

The magnetic disk device 1 calculates the position at which the head change has been performed, e.g. the relative eccentric position in the sector as the AC component head-head relative position (or the AC component head-head relative position correction value) pchg_hd_ac. It should be noted that although the first-order relative eccentric positions (relative positions between heads) of the plurality of heads HD at the time of head change is described above, the magnetic disk device 1 may calculate the relative eccentric positions (relative positions between heads) by calculating and adding high-order relative eccentricities larger than the first-order relative eccentricities of the plurality of heads HD at the time of head change.

The magnetic disk device 1 sets the relative eccentric position (=dprro1 [sct]) corresponding to the two heads HD before and after the head change to the AC component head-to-head relative position (or the AC component head-to-head relative position correction value) pchg_hd_ac.

The magnetic disk device 1 calculates the head-to-head relative position pchg_hd by adding the DC component head-to-head relative position pchg_hd_dc and the AC component head-to-head relative position pchg_hd_ac. The magnetic disk device 1 adds the head-to-head relative position pchg_hd to the estimated position pesti.

The magnetic disk device 1 corrects the servo zone according to the estimated position of the subsequent sample at the time of head change. For example, the magnetic disk device 1 determines whether the estimated position of the subsequent sample to the boundary BD of the servo zone where the subsequent head HD after the head change is adjacent in the radial direction is located in the servo zone in the outward direction or whether the estimated position is located in the servo zone in the inward direction in the radial direction. The magnetic disk device 1 corrects (or adjusts) the timing of the servo gate corresponding to the servo wedge SvWd (servo region SvR) of the servo zone in which the head HD is disposed after the head change according to the determination result.

At the time of head change, the magnetic disk device 1 estimates the RRO position Prro based on the RRO compensation current Ivcm_rro, and calculates the relative velocity (in the following, sometimes referred to as a head-to-head relative velocity) dvrro1 between the current head HD and the subsequent head HD based on the RRO position Prro.

It should be noted that the magnetic disk device 1 may calculate a fluctuation in the RRO position by a method of obtaining a fluctuation in the RRO position from a change in one rotation of the servo track number demodulated in a state in which the actuator is pressed against the inner circumferential stopper, a method of obtaining a fluctuation in the RRO position from a change in one rotation of the servo track number demodulated in a state in which the first or higher order wave component of the applied current of the actuator ACT (for example, the VCM 14) is small in a state in which the head is tracking on the disk, or a method of obtaining a fluctuation in the RRO position from a change in one rotation of the servo track number demodulated in a state in which the applied current of the actuator ACT (for example, the VCM 14) is 0 or a constant bias current is applied in one rotation for stopping the head at a radial position on a particular disk in a state in which the head is on the disk. In the case in which a disk shift (for example, primary eccentricity) occurs, the magnetic disk device 1 may calculate a fluctuation in the RRO position based on a fluctuation in the interval of the servo wedges SvWd.

FIG. 21 is a flowchart illustrating an example of a head change processing method according to the present embodiment. For example, the magnetic disk device 1 executes the head change processing illustrated in FIG. 21 as background processing.

The magnetic disk device 1 receives the interrupt processing for each sample (B2101), determines the head number of the subsequent head HD specified by the command received from the host 100 or any other component (B2102), and calculates the head-to-head relative position correction value corresponding to the two heads HD before and after the head change (B2103). The magnetic disk device 1 corrects the servo zone in which the subsequent head is disposed at the time of head change based on the head-to-head relative position correction value (B2104). The magnetic disk device 1 performs a head change (B2105). For example, the magnetic disk device 1 changes the head from the head HD0 to the head HD1. The magnetic disk device 1 receives an interrupt process for each sample (B2106) and ends the process.

Figure 22:
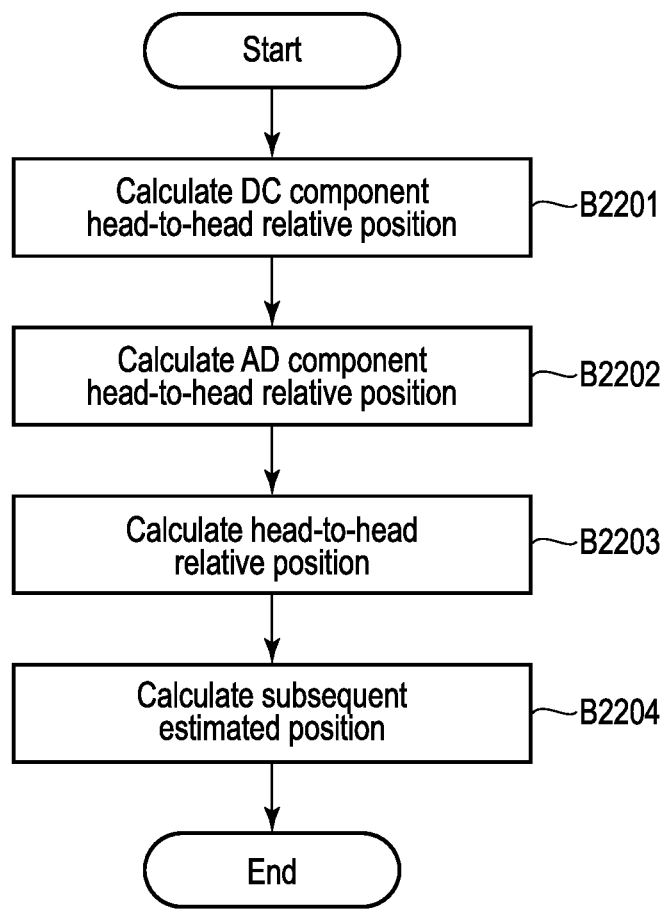
FIG. 22 is a flowchart illustrating an example of a calculation processing method for a head-to-head relative position according to an embodiment.

FIG. 22 is a flowchart illustrating an example of a calculation processing method of the head-to-head relative position according to the present embodiment. For example, the magnetic disk device 1 executes the calculation processing of the head-to-head relative position illustrated in FIG. 22 in the background processing.

The magnetic disk device 1 calculates a DC component head-to-head relative position (B2201), and calculates an AC component head-to-head relative position (B2202). The magnetic disk device 1 calculates the head-to-head relative position based on the DC component head-to-head relative position and the AC component head-to-head relative position (B2203). For example, the magnetic disk device 1 calculates the head-to-head relative position by adding the DC component head-to-head relative position to the AC component head-to-head relative position. The magnetic disk device 1 adds the head-to-head relative position to the current estimated position corresponding to the current head HD to calculate the subsequent estimated position corresponding to the subsequent head HD (B2204), and ends the process.

Figure 23:
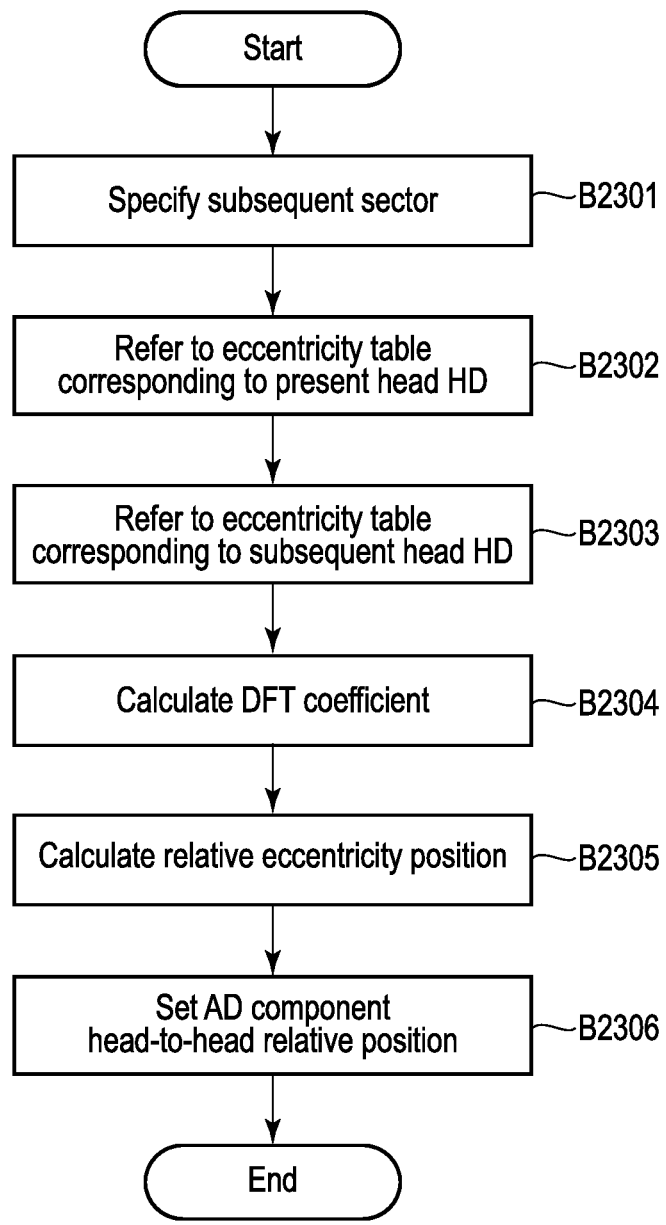
FIG. 23 is a flowchart illustrating an example of a calculating processing method for an AC component head-to-head relative position according to an embodiment.

FIG. 23 is a flowchart illustrating an example of a calculating processing method for the AC component head-to-head relative position according to the present embodiment. For example, the magnetic disk device 1 executes the calculating processing of the AC component head-to-head relative position illustrated in FIG. 23 in the background processing.

The magnetic disk device 1 specifies a next sector according to a command received from the host 100 or any other component (B2301). The magnetic disk device 1 refers to an eccentricity table corresponding to the current head HD, e.g. a table of eccentricity compensation current values corresponding to the current head HD (B2302). The magnetic disk device 1 refers to an eccentricity table corresponding to the subsequent head HD, e.g. a table of eccentricity compensation current values corresponding to the subsequent head HD (B2303). The magnetic disk device 1 calculates the SIN component and the COS component of the DFT coefficient corresponding to the head-to-head relative positions of the two current heads HD before and after the head change and the subsequent head HD (B2304). For example, the magnetic disk device 1 calculates the first-order SIN component and the first-order COS component of the DFT coefficient corresponding to the head-to-head relative positions of the two current heads HD and the subsequent head HD before and after the head change. The magnetic disk device 1 calculates the relative eccentric positions of the two current heads HD before and after the head change and the subsequent head HD based on the DFT coefficient (B2305). For example, the magnetic disk device 1 calculates the first-order relative eccentric positions of the two current heads HD and the subsequent head HD before and after the head change. The magnetic disk device 1 sets the relative eccentric positions of the two current heads HD before and after the head change and the subsequent head HD to an AC component head-to-head relative position (or an AC component head-to-head relative position correction value) (B2306), and ends the process. For example, the magnetic disk device 1 sets the primary relative eccentric positions of the two current heads HD and the subsequent head HD before and after the head change as the relative positions between the heads for AC, and ends the process.

FIG. 24 is a flowchart illustrating an example of a correction processing method for a servo zone according to the present embodiment. For example, the magnetic disk device 1 executes servo zone correction processing illustrated in FIG. 24 by background processing.

The magnetic disk device 1 determines whether the subsequent estimated position is a servo zone in an outward direction or an inward direction to a boundary between two servo zones adjacent in the radial direction (B2401). For example, the magnetic disk device 1 determines whether the subsequent estimated position is on the servo zone SvZn10 side or the servo zone SvZn11 side to the boundary BD1. In the case in which it is determined that the subsequent estimated position is in the servo zone in the outward direction to the boundary of the servo zones (YES in B2401), the magnetic disk device 1 sets the subsequent estimated position to the servo zone in the outward direction (B2402), and ends the process. For example, in the case in which it is determined that the subsequent estimated position is on the servo zone SvZn10 side to the boundary BD1, the magnetic disk device 1 sets the subsequent estimated position in the servo zone SvZn10 and ends the process.

In the case in which it is determined that the subsequent estimated position is not in the servo zone in the outward direction to the boundary of the servo zones adjacent in the radial direction, i.e., the subsequent estimated position is in the servo zone in the inward direction (NO in B2401), the magnetic disk device 1 sets the subsequent estimated position to the servo zone in the inward direction to the boundary of the two adjacent servo zones (B2402), and ends the process. For example, in the case in which it is determined that the subsequent estimated position is on the servo zone SvZn11 side to the boundary BD1, the magnetic disk device 1 sets the subsequent estimated position in the servo zone SvZn11 and ends the process.

FIG. 25 is a flowchart illustrating an example of an interrupt processing method for each sample according to the present embodiment. For example, the magnetic disk device 1 executes an interrupt process for each sample illustrated in FIG. 25 as a foreground process.

The magnetic disk device 1 acquires the head position by reading the servo sector of the disk DK (B2501). The magnetic disk device 1 calculates the subsequent estimated position (B2502), and the magnetic disk device 1 calculates the current indication value based on the target acceleration, the target velocity, the subsequent estimated position, and the RRO current compensation value (B2503). The magnetic disk device 1 applies the VCM current to the VCM 14 according to the current indication value (B2504), and ends the process.

According to the present embodiment, the magnetic disk device 1 includes a plurality of disks DK0 and DK1 and a plurality of heads HD0 and HD1 respectively corresponding to the plurality of disks DK0 and DK1. After the subsequent disk shift occurs, the magnetic disk device 1 learns the eccentricity of the disks DK0 and DK1 and records the learning result in the eccentricity table. The magnetic disk device 1 calculates relative positions between heads corresponding to two heads HD before and after a head change in a next sector specified by a command received from the host 100 or any other component. The magnetic disk device 1 updates the subsequent estimated position and the servo zone based on the relative position between the heads. The magnetic disk device 1 corrects (or adjusts) the servo gate based on the subsequent estimated position and servo zone, and asserts the servo gate so as to read the servo wedge SvWd, and thus the servo read (or demodulation) of the servo wedge SvWd can be performed even though the head is changed after the subsequent disk shift. The magnetic disk device 1 can read the servo wedge SvWd by changing the head even though a subsequent disk shift occurs in the disk DK having a wide overlap region OvR in the radial direction. The data format efficiency of the disk DK can be improved. In other words, the magnetic disk device 1 can read the servo wedge SvWd by changing the head even though a subsequent disk shift occurs in the disk DK having the narrow overlap region OvR. Therefore, since the magnetic disk device 1 can narrow the overlap region OvR, the data format efficiency of the disk DK can be improved. The magnetic disk device 1 can improve reliability.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk device comprising:
a first disk including a plurality of first servo wedges divided into a first zone and a second zone at a boundary in a radial direction, the first servo wedges having a first servo pattern arranged in the first zone and a second servo pattern arranged in the second zone;
a second disk divided into the first zone and the second zone at the boundary in the radial direction, the second disk including a plurality of second servo wedges having the first servo pattern and the second servo pattern, the second disk having a second center position shifted from a first center position of the first disk; and
a first head which writes data to the first disk and reads data from the first disk;
a second head which writes data to the second disk and reads data from the second disk; and
a controller which calculates an estimated position at which the second head is estimated to be disposed on the second disk based on first relative position information related to a relative position in a radial direction between the first head and the second head when the first head is switched to the second head,
wherein the controller calculates the first relative position information based on second relative position information related to a relative position in a radial direction of the first head and the second head that fluctuate within one circle of the first disk and the second disk and third relative position information related to a relative position in the radial direction of the first head and the second head that do not fluctuate within one circle of the first disk and the second disk.

2. The magnetic disk device according to claim 1, wherein the controller calculates the second relative position information based on first eccentricity information on eccentricity in the first disk corresponding to the first head and second eccentricity information on eccentricity in the second disk corresponding to the second head.

3. The magnetic disk device according to claim 2, wherein the controller calculates a first discrete Fourier transform coefficient corresponding to the first head based on the first eccentricity information, calculates a second discrete Fourier transform coefficient corresponding to the second head based on the second eccentricity information, and calculates the second relative position information based on the first discrete Fourier transform coefficient and the second discrete Fourier transform coefficient.

4. The magnetic disk device according to claim 1, wherein the controller calculates the first relative position information at a timing at which a command to switch the first head to the second head is received.

5. A magnetic disk device comprising:
a first disk including a plurality of first servo wedges divided into a first zone and a second zone at a boundary in a radial direction, the first servo wedges having a first servo pattern arranged in the first zone and a second servo pattern arranged in the second zone;
a second disk divided into the first zone and the second zone at the boundary in the radial direction, the second disk including a plurality of second servo wedges having the first servo pattern and the second servo pattern, the second disk having a second center position shifted from a first center position of the first disk; and a first head which writes data to the first disk and reads data from the first disk;

a second head which writes data to the second disk and reads data from the second disk; and a controller which calculates an estimated position at which the second head is estimated to be disposed on the second disk based on first relative position information related to a relative position in a radial direction between the first head and the second head when the first head is switched to the second head, wherein when the first head located in the first zone is switched to the second head, the controller determines whether the second head is located in first zone or whether the second head is located in the second zone based on the boundary.

6. The magnetic disk device according to claim 5, wherein the controller determines that the second head is located in the first zone when the estimated position is located in a first direction on the first zone side to the boundary, and determines that the second head is located in the second zone when the estimated position is located on the second zone side to the boundary.

7. The magnetic disk device according to claim 6, wherein the controller sets the second head in the second zone when it is determined that the second head is located in the second zone.

8. The magnetic disk device according to claim 7, wherein the controller asserts a servo gate so as to read the first servo pattern using the second head.

9. The magnetic disk device according to claim 5, wherein the boundary is located in a region in which the first servo pattern and the second servo pattern are arranged in a circumferential direction.

10. A head change processing method applied to a magnetic disk device including: a first disk including a plurality of first servo wedges divided into a first zone and a second zone at a boundary in a radial direction, the first servo wedges having a first servo pattern arranged in the first zone and a second servo pattern arranged in the second zone; a second disk including a plurality of second servo wedges divided into the first zone and the second zone at the boundary in the radial direction, the second servo wedges having the first servo pattern and the second servo pattern, the second disk having a second center position shifted from a first center position of the first disk; a first head which writes data to the first disk and reads data from the first disk; and a second head which writes data to the second disk and reads data from the second disk, the method comprising:

calculating an estimated position at which the second head is estimated to be disposed on the second disk based on first relative position information related to a relative position in a radial direction between the first head and the second head when the first head is switched to the second head, and calculating the first relative position information based on second relative position information related to a relative position in a radial direction of the first head and the second head that fluctuate within one circle of the first disk and the second disk and third relative position information related to a relative position in the radial direction of the first head and the second head that do not fluctuate within one circle of the first disk and the second disk.

11. The head change processing method according to claim 10, further comprising:

calculating the second relative position information based on first eccentricity information on eccentricity in the first disk corresponding to the first head and second eccentricity information on eccentricity in the second disk corresponding to the second head.

12. The head change processing method according to claim 11, further comprising:

calculating a first discrete Fourier transform coefficient corresponding to the first head based on the first eccentricity information;

calculating a second discrete Fourier transform coefficient corresponding to the second head based on the second eccentricity information; and calculating the second relative position information based on the first discrete Fourier transform coefficient and the second discrete Fourier transform coefficient.

13. The head change processing method according to claim 10, further comprising:

calculating the first relative position information at a timing at which a command to switch the first head to the second head is received.

14. A head change processing method applied to a magnetic disk device including: a first disk including a plurality of first servo wedges divided into a first zone and a second zone at a boundary in a radial direction, the first servo wedges having a first servo pattern arranged in the first zone and a second servo pattern arranged in the second zone; a second disk including a plurality of second servo wedges divided into the first zone and the second zone at the boundary in the radial direction, the second servo wedges having the first servo pattern and the second servo pattern, the second disk having a second center position shifted from a first center position of the first disk; a first head which writes data to the first disk and reads data from the first disk; and a second head which writes data to the second disk and reads data from the second disk, the method comprising:

calculating an estimated position at which the second head is estimated to be disposed on the second disk based on first relative position information related to a relative position in a radial direction between the first head and the second head when the first head is switched to the second head, and when the first head located in the first zone is switched to the second head, determining whether the second head is located in first zone or whether the second head is located in the second zone based on the boundary.

15. The head change processing method according to claim 14, further comprising:

determining that the second head is located in the first zone when the estimated position is located in a first direction on the first zone side to the boundary; and determining that the second head is located in the second zone when the estimated position is located on the second zone side to the boundary.

16. The head change processing method according to claim 15, further comprising:

setting the second head in the second zone when it is determined that the second head is located in the second zone.

17. The head change processing method according to claim 16, further comprising:

asserting a servo gate so as to read the first servo pattern using the second head.

18. The head change processing method according to claim 14, wherein the boundary is located in a region in which the first servo pattern and the second servo pattern are arranged in a circumferential direction.

* * * * *